United States Patent
Jun et al.

(10) Patent No.: US 8,521,159 B2
(45) Date of Patent: Aug. 27, 2013

(54) APPARATUS AND METHOD FOR DETERMINING NEIGHBOR BS INFORMATION IN A WIRELESS COMMUNICATION SYSTEM

(75) Inventors: Byung-Wook Jun, Seoul (KR); Jae-Hee Cho, Seoul (KR); Yung-Soo Kim, Seongnam-si (KR); Jong-Hyung Kwun, Seoul (KR); Ju-Mi Lee, Seoul (KR); Young-Bo Cho, Seongnam-si (KR); Jea-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 12/802,379

(22) Filed: Jun. 4, 2010

(65) Prior Publication Data
US 2010/0311422 A1   Dec. 9, 2010

(30) Foreign Application Priority Data

Jun. 5, 2009   (KR) .................. 10-2009-0050121
Jun. 12, 2009  (KR) .................. 10-2009-0052263
Jun. 26, 2009  (KR) .................. 10-2009-0057928

(51) Int. Cl.
*H04W 48/16* (2009.01)
(52) U.S. Cl.
USPC .............. 455/434; 455/432.1; 455/435.2; 455/455; 455/515; 370/331
(58) Field of Classification Search
USPC ....... 455/434, 432.1, 455, 515; 370/331–333
See application file for complete search history.

(56) References Cited

U.S. PATENT DOCUMENTS

| | | | |
|---|---|---|---|
| 8,396,486 B2* | 3/2013 | Lee et al. | 455/456.1 |
| 2005/0175071 A1* | 8/2005 | Hoffmann et al. | 375/145 |
| 2006/0092872 A1* | 5/2006 | Lee et al. | 370/328 |
| 2006/0229075 A1* | 10/2006 | Kim et al. | 455/436 |
| 2007/0010251 A1* | 1/2007 | Cho et al. | 455/436 |
| 2007/0021119 A1* | 1/2007 | Lee et al. | 455/436 |
| 2007/0064666 A1* | 3/2007 | Kwun et al. | 370/343 |
| 2007/0160083 A1* | 7/2007 | Un et al. | 370/470 |
| 2009/0047958 A1* | 2/2009 | Rimhagen et al. | 455/436 |
| 2009/0135761 A1* | 5/2009 | Khandekar et al. | 370/328 |
| 2009/0168745 A1* | 7/2009 | Ahmadi et al. | 370/350 |
| 2009/0227255 A1* | 9/2009 | Thakare | 455/434 |
| 2009/0325569 A1* | 12/2009 | Chou | 455/422.1 |
| 2010/0003986 A1* | 1/2010 | Chen | 455/436 |
| 2010/0008324 A1* | 1/2010 | Lee et al. | 370/331 |
| 2010/0069073 A1* | 3/2010 | Chen et al. | 455/437 |
| 2010/0085941 A1* | 4/2010 | Chin et al. | 370/332 |
| 2010/0103896 A1* | 4/2010 | Cho et al. | 370/329 |
| 2010/0151858 A1* | 6/2010 | Brisebois et al. | 455/434 |
| 2010/0165942 A1* | 7/2010 | Liao et al. | 370/329 |

(Continued)

*Primary Examiner* — Kamran Afshar
*Assistant Examiner* — Mong-Thuy Tran

(57) ABSTRACT

An apparatus and method determines neighbor Base Station (BS) information in a wireless communication system where a macro cell and a Femto cell coexist. The method includes, when a preamble scanning duration arrives, acquiring preamble information on at least one neighbor BS through preamble scanning. It is determined whether to scan a header for at least one neighbor BS among neighbor BSs for which the preamble information are acquired, in consideration of at least one of the acquisition or non-acquisition of new preamble information through the preamble scanning and a variation of an environment of a preamble acquired through the preamble scanning. And, in case that it is determined to scan the header, a header for a corresponding neighbor BS is scanned and header information of the neighbor BS is acquired.

27 Claims, 20 Drawing Sheets

(56) References Cited

U.S. PATENT DOCUMENTS

| | | | |
|---|---|---|---|
| 2010/0246508 A1* | 9/2010 | Chang et al. | 370/329 |
| 2010/0290374 A1* | 11/2010 | Chin et al. | 370/281 |
| 2010/0309849 A1* | 12/2010 | Park et al. | 370/328 |
| 2011/0105129 A1* | 5/2011 | Kim et al. | 455/443 |
| 2011/0212731 A1* | 9/2011 | Lee et al. | 455/450 |

\* cited by examiner

APPARATUS AND METHOD FOR DETERMINING NEIGHBOR BS INFORMATION IN A WIRELESS COMMUNICATION SYSTEM

CROSS-REFERENCE TO RELATED APPLICATION(S) AND CLAIM OF PRIORITY

This application is related to and claims priority under 35 U.S.C. §119(a) to a Korean Patent Application filed in the Korean Intellectual Property Office on Jun. 5, 2009 and assigned Serial No. 10-2009-0050121, and in the Korean Intellectual Property Office on Jun. 12, 2009 and assigned Serial No. 10-2009-0052263 and in the Korean Intellectual Property Office on Jun. 26, 2009 and assigned Serial No. 10-2009-0057928, the contents of which are herein incorporated by reference.

TECHNICAL FIELD OF THE INVENTION

The present invention relates to an apparatus and method for supporting a femto Base Station (BS) in a wireless communication system. More particularly, the present invention relates to an apparatus and method for determining neighbor BS information in a Mobile Station (MS) of a wireless communication system in which a macro BS and a femto BS are mixed.

BACKGROUND OF THE INVENTION

In a cellular wireless communication system, when a signal quality with a serving BS is deteriorated, an MS scans neighbor BSs with reference to a neighbor BS list received from the serving BS. Afterwards, the MS determines handover performance or non-performance using the scanning result, and selects a target BS for handover.

When the MS performs scanning for a Frequency Allocation (FA) different from an operation FA of the serving BS, a communication between the MS and the serving BS is temporarily interrupted during a scanning time duration.

A wireless communication system can provide a femto cell service for solving a service problem of a propagation shadow area while providing a high speed data service. A femto cell means a cell area of a miniature BS, which accesses a mobile communication core network through a broadband network installed within doors such as an office, a house, and such. Here, the miniature BS is a small output BS that a user can install in person. The miniature BS can be called a micro BS, a self configurable BS, a compact BS, an indoor BS, a home BS, a femto BS, and such. In the following description, the miniature BS is named the femto BS.

FIG. 1 illustrates an environment constituted of a macro cell, and FIG. 2 illustrates an environment where a macro cell and a femto cell are mixed.

In the environment of FIG. 2 where a macro BS and a femto BS are mixed, the number of neighbor BSs greatly increases compared to the environment of FIG. 1 constituted of only a macro BS. Thus, in the environment of FIG. 2, an overhead caused by transmission of a neighbor BS list for femto BSs increases.

Alternatively, when a serving BS does not provide the neighbor BS list, an MS has to fully search all FAs. Thus, the MS requires a large amount of operations and, while the MS searches different FAs, communication with the serving BS is interrupted, thus causing a difficulty in providing a real-time service.

Also, in the environment where the macro BS and the femto BS are mixed, in order to detect femto BSs positioned around, an MS has to frequently scan neighbor BSs irrespective of a signal quality with the serving BS. Thus, the MS suffers a frequent interruption of communication with the serving BS, thereby causing deterioration of a real-time service quality and system throughput.

SUMMARY OF THE INVENTION

To address the above-discussed deficiencies of the prior art, it is a primary object of the present invention to substantially solve at least the above problems and/or disadvantages and to provide at least the advantages below. Accordingly, one aspect of the present invention is to provide an apparatus and method for supporting a femto cell in a wireless communication system.

Another aspect of the present invention is to provide an apparatus and method for efficiently recognizing a femto Base Station (BS) in a Mobile Station (MS) of a wireless communication system where a macro cell and a femto cell coexist.

A further aspect of the present invention is to provide an apparatus and method for efficiently acquiring neighbor BS information in an MS of a wireless communication system where a macro cell and a femto cell coexist.

Yet another aspect of the present invention is to provide an apparatus and method for reducing a time of interruption of communication with a serving BS resulting from scanning of an MS in a wireless communication system where a macro cell and a femto cell coexist.

Yet another aspect of the present invention is to provide an apparatus and method for selectively performing Layer 2 (L2) scanning in an MS of a wireless communication system where a macro cell and a femto cell coexist.

Yet another aspect of the present invention is to provide an apparatus and method for reducing a time of interruption of communication with a serving BS resulting from L2 scanning of an MS in a wireless communication system in which a macro cell and a femto cell coexist.

Yet another aspect of the present invention is to provide an apparatus and method for changing a SuperFrame Header (SFH) in consideration of an L2 scanning time point of an MS in a BS of a wireless communication system in which a macro cell and a femto cell coexist.

Yet another aspect of the present invention is to provide an apparatus and method for determining an L2 scanning time point in consideration of a time point of no change of an SFH of a serving BS, in an MS of a wireless communication system in which a macro cell and a femto cell coexist.

The above aspects are achieved by providing an apparatus and method for determining neighbor BS information in a wireless communication system.

According to one aspect of the present invention, a method for determining neighbor BS information in an MS of a wireless communication system in which a macro cell and a femto cell coexist is provided. The method includes, when a preamble scanning duration arrives, acquiring preamble information on at least one neighbor BS through preamble scanning. The method also includes determining whether to scan a header for at least one neighbor BS among neighbor BSs for which the preamble information are acquired, in consideration of at least one of the acquisition or non-acquisition of new preamble information through the preamble scanning and a variation of an environment of a preamble acquired through the preamble scanning. And, in response to determining to scan the header, a header for a corresponding neighbor BS is scanned, and header information of the neighbor BS is acquired.

According to another aspect of the present invention, an apparatus for determining neighbor BS information in an MS of a wireless communication system where a macro cell and a femto cell coexist is provided. The apparatus includes a receiver, a controller, and a scanning controller. The receiver receives a signal of an operation frequency band converted under the control of the controller. The Controller controls to convert the operation frequency band of the receiver for the sake of preamble scanning and header scanning. When a preamble scanning duration arrives, the controller acquires preamble information of at least one neighbor BS through the preamble scanning. When it is determined to scan a header in the scanning controller, the controller acquires header information on at least one neighbor BS through the header scanning. The scanning controller determines whether to scan a header for at least one neighbor BS among neighbor BSs for which the preamble information are acquired, in consideration of at least one of the acquisition or non-acquisition of new preamble information through the preamble scanning and a variation of an environment of a preamble acquired through the preamble scanning.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION OF THE INVENTION

Figure 1:
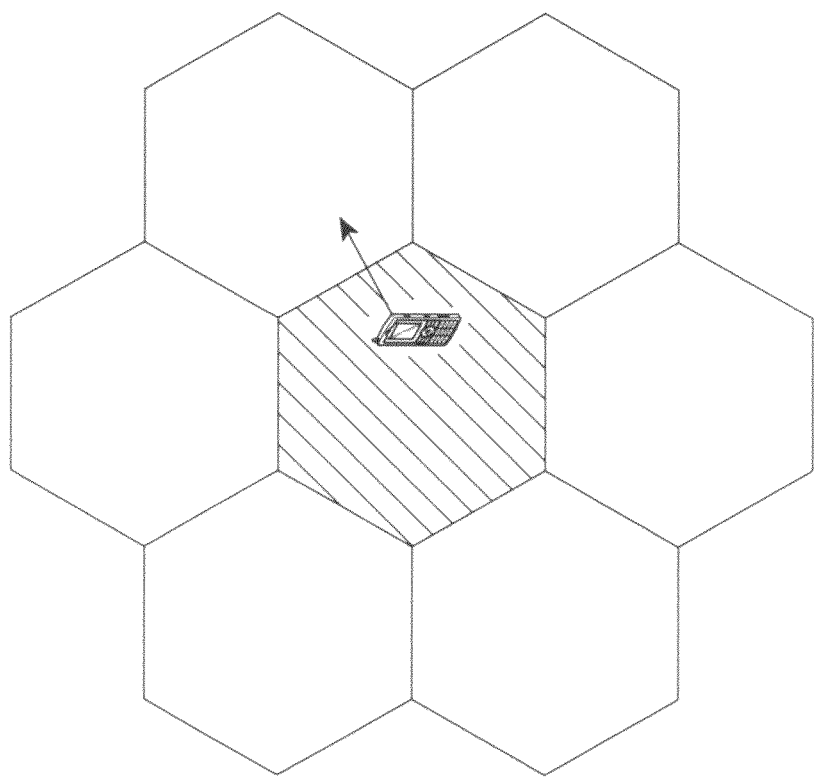
FIG. 1 illustrates an environment constituted of a macro cell.
Figure 2:
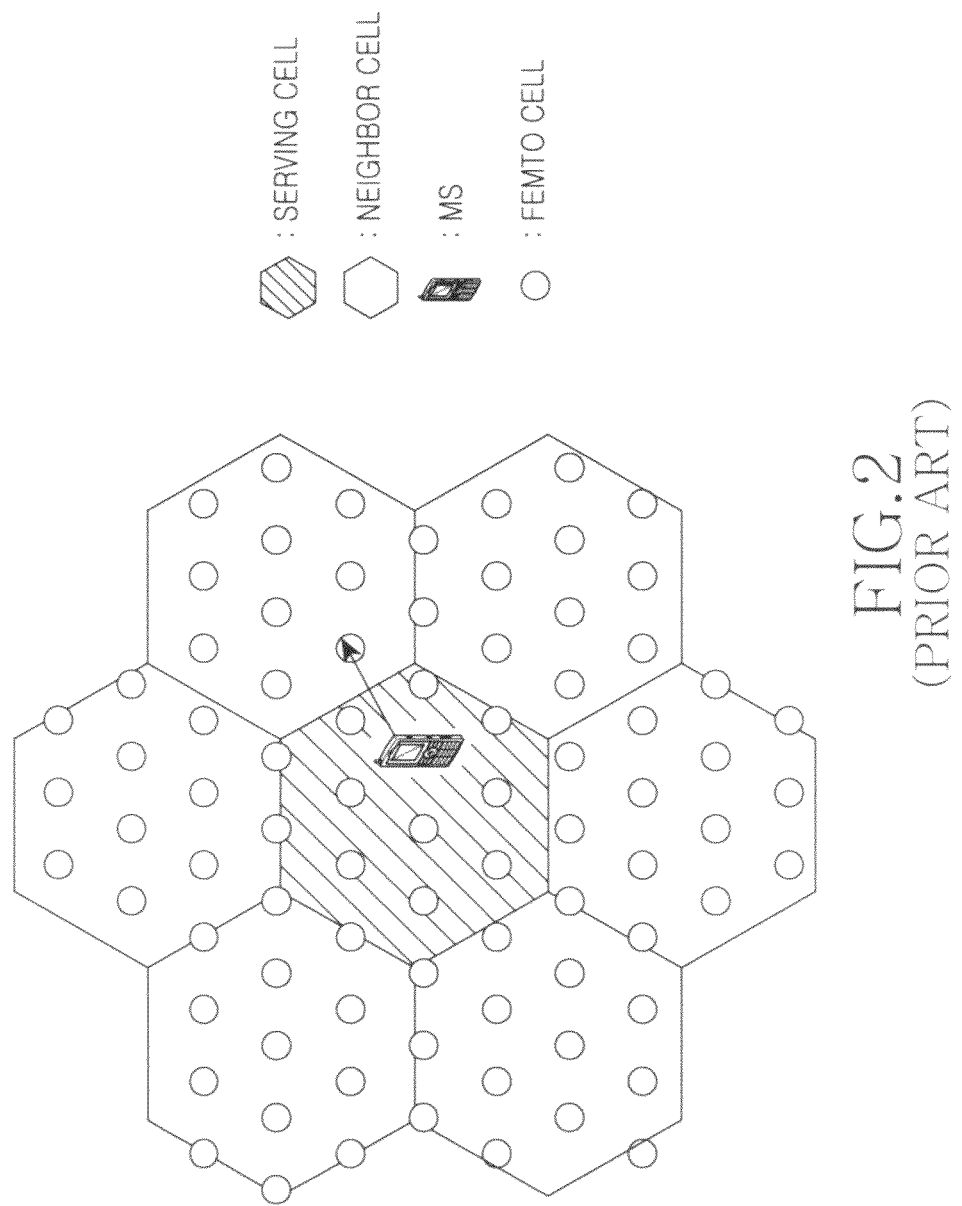
FIG. 2 illustrates an environment where a macro cell and a femto cell are mixed.

FIGS. 3 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Embodiments of the present invention, which provide a technique for determining neighbor Base Station (BS) information through scanning in a Mobile Station (MS) of a wireless communication system in which a macro cell and a femto cell are mixed according to the present invention, are described below.

The following description is made on the assumption that a wireless communication system is based on Institute of Electrical and Electronics Engineers (IEEE) 802.16m, but an embodiment of the present invention is identically applicable to other wireless communication systems in which miniature BSs are installed. Here, the miniature BS is a small output BS that a user can install in person. The miniature BS can be called a micro BS, a self configurable BS, a compact BS, an indoor BS, a home BS, a femto BS, and such. In the following description, the miniature BS is named the femto BS.

When a macro cell and a femto cell are mixed, an MS cannot distinguish a femto BS through only a preamble. Thus, in order to distinguish a neighbor femto BS, the MS performs Layer 1 (L1) scanning for acquiring L1 information and Layer 2 (L2) scanning for acquiring L2 information in a wireless communication system where a macro cell and a femto cell are mixed. Here, the L1 information includes a preamble index and an SA-preamble measurement value, and the L2 information includes a BS ID (Identifier) corresponding to the preamble index, a Closed Subscriber Group (CSG) ID, and such. Accordingly, the L1 scanning can be named preamble scanning, and the L2 scanning may be named header scanning.

In the following description, a neighbor BS represents a neighbor femto BS, but may represent a neighbor macro BS. In the following description also, a serving BS represents a BS that has ever provided service before an MS performs handover among BSs constituting a wireless communication system, and a target BS represents a new BS that an MS accesses through handover. Here, the serving BS means a serving macro BS or a serving femto BS.

The L1 scanning represents a process in which an MS detects and measures a Secondary Advanced (SA) preamble of a BS to acquire L1 information of the BS. The L2 scanning represents a process in which an MS decodes a SuperFrame Header (SFH) of a BS to acquire L2 information of the BS. At this time, the MS selectively performs the L2 scanning considering the L1 scanning result as illustrated in FIG. 3 below.

Figure 3:
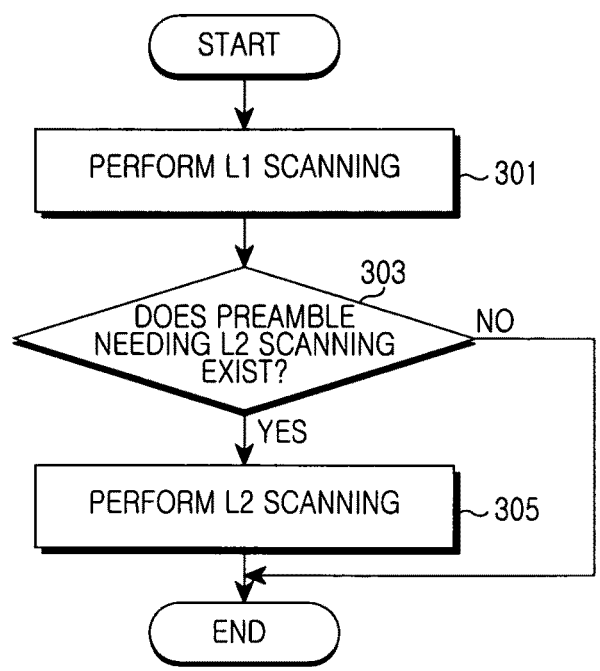
FIG. 3 illustrates a scanning procedure of a Mobile Station (MS) according to an embodiment of the present invention.

FIG. 3 illustrates a scanning procedure of an MS according to an embodiment of the present invention.

Referring to FIG. 3, in block 301, the MS performs L1 scanning for neighbor BSs. For example, if it is an L1 scanning duration according to an L1 scanning pattern, the MS stops communicating with a serving BS, and converts its own operation Frequency Allocation (FA) to an FA of a neighbor BS intended to search. The MS then detects and measures an SA preamble of the neighbor BS through the converted FA. At this time, the MS detects only an SA preamble whose measurement value is equal to or is more than an SA-preamble monitoring set threshold.

After detecting the SA preamble through the L1 scanning, the MS proceeds to block 303 and determines the performance or non-performance of L2 scanning according to the L1 scanning result. For example, when an SA preamble newly detected by the MS through L1 scanning exists, the MS determines to perform L2 scanning for the newly detected SA preamble. In detail, in FIG. 7A, it is assumed that when an MS is positioned at a first point, the MS can detect and measure an SA preamble included in an identifiable area '1' and, when the MS is positioned at a second point, the MS can detect and measure an SA preamble included in an identifiable area '2'. Also, it is assumed that when the MS is positioned at a third point, the MS can detect and measure an SA preamble included in an identifiable area 3. Accordingly, when the MS moves from the first point to the second point, the MS cannot detect an SA-preamble #1 because an SA-preamble #1 measurement value measured through the L1 scanning is less than the SA-preamble monitoring set threshold. That is, the MS excludes the SA-preamble #1 from an SA-preamble monitoring set.

Afterwards, if the MS moves to the third point, the MS can newly detect the SA-preamble #1 through the L1 scanning. At this time, by way of newly detecting the SA-preamble #1, the MS cannot be aware of L2 information of a neighbor BS corresponding to the SA-preamble #1. Accordingly, in order to acquire the L2 information of the neighbor BS, the MS determines to perform L2 scanning for the SA-preamble #1. Here, the SA-preamble monitoring set represents a set of SA preambles detected by the MS through the L1 scanning and BSs corresponding to the respective SA preambles.

In another example, the MS may determine the performance or non-performance of L2 scanning considering a variance of a reception environment of an SA preamble detected by the MS through L1 scanning. In detail, in FIG. 7B, it is assumed that when an MS is positioned at a first point, the MS can detect and measure an SA preamble included in an identifiable area '1' and, when the MS is positioned at a second point, the MS can detect and measure an SA preamble included in an identifiable area '2'. Also, it is assumed that when the MS is positioned at a third point, the MS can detect and measure an SA preamble included in an identifiable area '3'. Accordingly, when the MS moves from the first point to the third point through the second point, the MS can continuously detect an SA-preamble #1 through the L1 scanning. At this time, when the SA-preamble #1 again detected by the MS is an SA preamble of the same neighbor BS, a mapping relationship between a preamble index and L2 information has no change. However, if the SA-preamble #1 detected by the MS at the first point and the SA-preamble #1 detected by the MS at the third point are SA preambles of different neighbor BSs, there occurs a problem that a mapping relationship between a preamble index and L2 information is inconsistent. Accordingly, the MS determines the performance or non-performance of L2 scanning considering the variance of the reception environment of the SA preamble detected through the L1 scanning. At this time, the MS can calculate a variance of a reception environment of an SA preamble whose preamble index is equal to '1' using Equation 1 below.

$$V_{current}[i] = V_{previous}[i] + \frac{N_{added} + N_{deleted}}{N[i]} \qquad [\text{Eqn. 1}]$$

In Equation (1), the '$V_{current}[i]$' represents a variance of a reception environment of an SA preamble whose preamble index detected through current L1 scanning is equal to 'i', the '$V_{previous}[i]$' represents a variance of a reception environment of an SA preamble whose preamble index detected through previous L1 scanning is equal to 'i', the '$N_{added}$' represents the number of SA preambles newly detected through the current L1 scanning, the '$N_{deleted}$' represents the number of SA preambles not detected through the current L1 scanning among SA preambles detected through the previous L1 scanning, and the 'N[i]' represents the number of preamble indexes (i) included in an SA-preamble monitoring set at a time point of carrying out recent L2 scanning for an SA preamble whose preamble index is equal to 'i'. In other words, the '$N_{added}$' represents the number of preamble indexes of SA preambles added to the SA-preamble monitoring set through the current L1 scanning, and the '$N_{deleted}$' represents the number of preamble indexes of SA preambles deleted from the SA-preamble monitoring set through the current L1 scanning.

According to Equation 1 above, the MS calculates a variance of a reception environment of an SA preamble in consideration of the number of SA preambles added and deleted from the SA-preamble monitoring set through the L1 scanning. At this time, when the variance of the reception environment of the SA preamble is less than a threshold variation, the MS recognizes that a mapping relationship between a preamble index of an SA preamble again detected and L2 information is maintained and thus, does not perform L2 scanning. However, when the variance of the reception environment of the SA preamble is greater than or is equal to the threshold variation, the MS recognizes that the mapping relationship between the preamble index of the SA preamble again detected and the L2 information varies and thus, performs the L2 scanning.

When an SA preamble needing the L2 scanning does not exist in block 303, the MS judges that it does not perform the L2 scanning. Accordingly, the MS terminates the procedure according to the embodiment of the present invention. At this time, the MS performs next L1 scanning according to the L1 scanning pattern.

Alternatively, when at least one SA preamble needing the L2 scanning exists in block 303, the MS proceeds to block 305 and performs the L2 scanning for the SA preamble. That is, the MS decodes an SFH for the SA preamble to acquire L2 information of a neighbor BS corresponding to the SA preamble.

Afterwards, the MS terminates the procedure according to the embodiment of the present invention. At this time, the MS performs the next L1 scanning according to the L1 scanning pattern.

Figure 4:
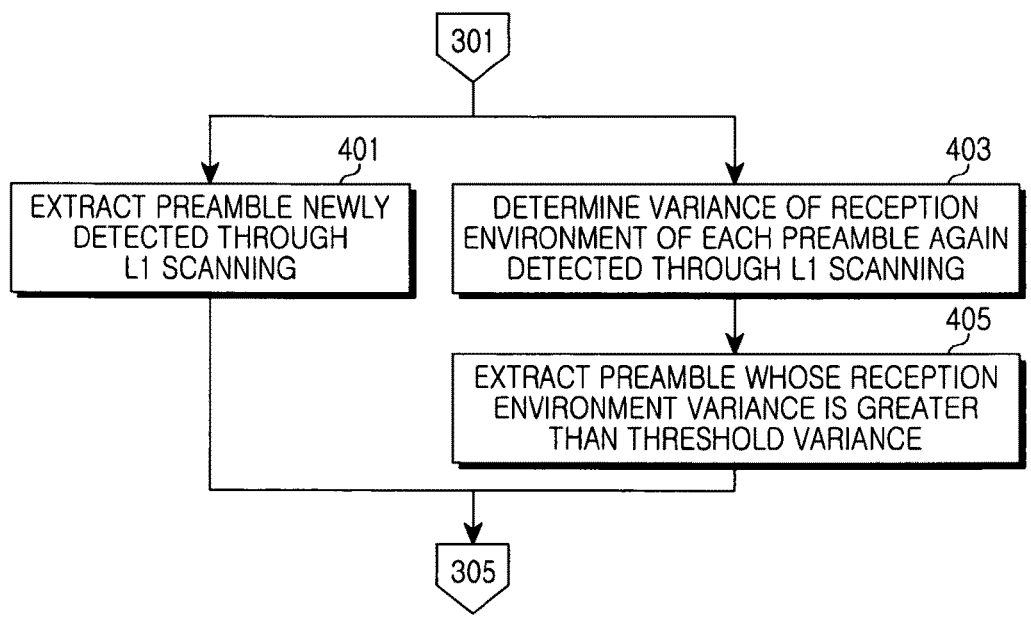
FIG. 4 illustrates a procedure for determining the performance or non-performance of Layer 2 (L2) scanning in an MS according to an embodiment of the present invention.

As described above, when an MS determines the performance or non-performance of L2 scanning considering L1 scanning result, the MS can determine the performance or non-performance of L2 scanning as illustrated in FIG. 4 below.

FIG. 4 illustrates a procedure for determining the performance or non-performance of L2 scanning in an MS according to an embodiment of the present invention.

Referring to FIG. 4, after the MS performs the L1 scanning in block 301 of FIG. 3, the MS proceeds to block 401 and extracts an SA preamble newly detected through the L1 scanning. For example, the MS manages an SA-preamble monitoring set configured according to Table 1 below.

TABLE 1

| L1 information | L2 information | | L2 update state | |
| --- | --- | --- | --- | --- |
| Preamble index | BS ID | CSG ID | $V_{current}$ | $V_{previous}$ |
| #1 | A | 8 | xx | yy |
| #73 | B | 7 | xx | yy |
| . | . | . | . | . |
| . | . | . | . | . |
| . | . | . | . | . |

The MS updates the SA-preamble monitoring set through the L1 scanning. In detail, the MS adds a newly detected SA preamble to the SA-preamble monitoring set, and deletes information on an SA preamble not again detected from the SA-preamble monitoring set.

Thus, in block 401, the MS extracts the SA preamble added to the SA-preamble monitoring set through the L1 scanning. At this time, the MS determines whether to perform L2 scanning according to the extraction or non-extraction of the SA preamble of block 401.

Also, in block 403, the MS determines a reception environment variation for each SA preamble again detected through the L1 scanning. For example, the MS calculates a variance of a reception environment of an SA preamble whose preamble index is equal to 'i' using Equation 1 above.

After determining the reception environment variance of the SA preamble, the MS proceeds to block 405 and extracts an SA preamble whose reception environment variation is greater than a threshold variation. At this time, the MS determines whether to perform L2 scanning according to the extraction or non-extraction of the SA preamble of block 405.

Afterwards, if the SA preamble extracted in block 401 or 405 exists, the MS proceeds to block 305 of FIG. 3 and performs the L2 scanning for the extracted SA preamble of block 401 or 405. At this time, if the SA preamble is extracted in at least one of blocks 401 and 405, the MS performs the L2 scanning.

Figure 5:
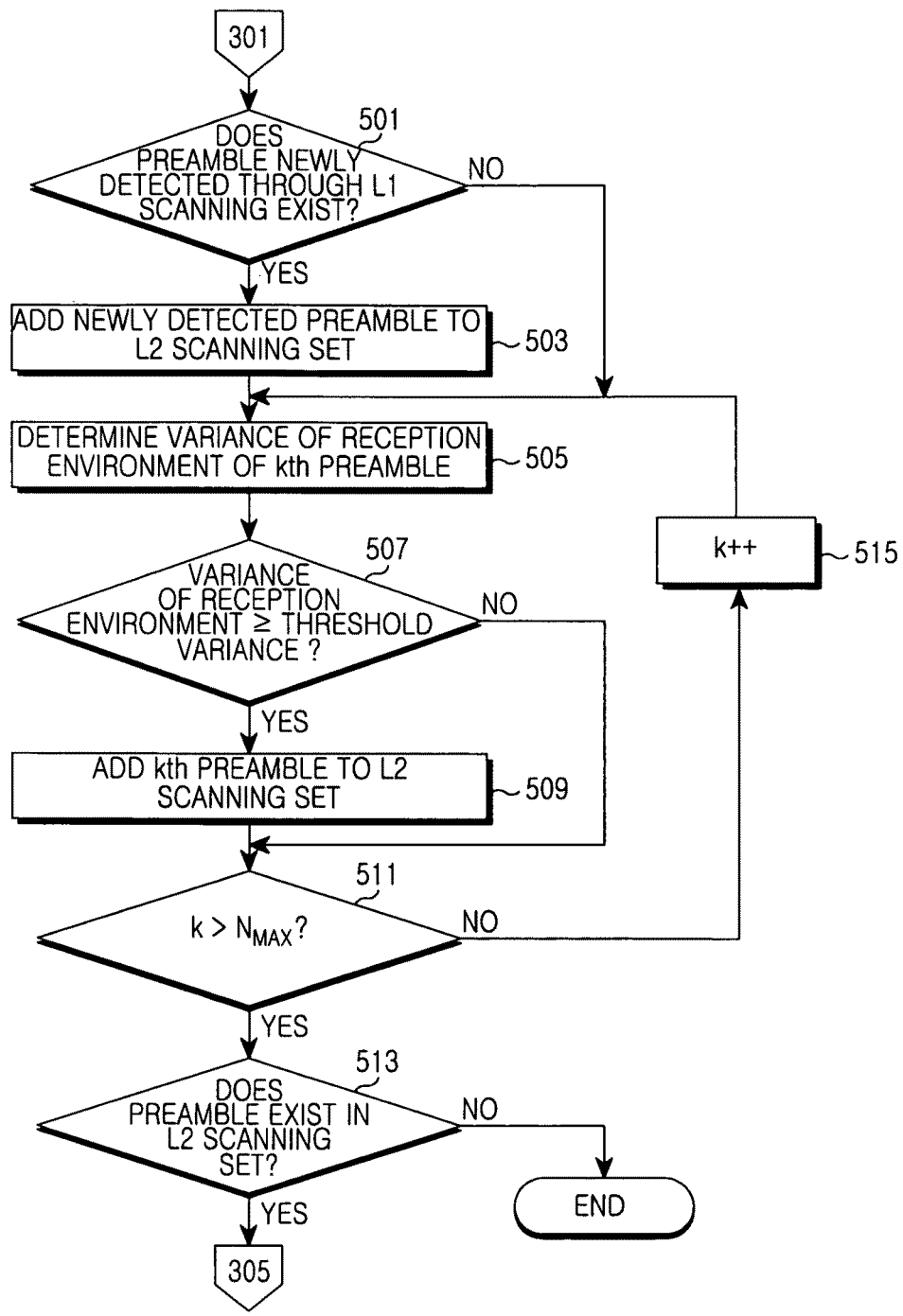
FIG. 5 illustrates a procedure for determining the performance or non-performance of L2 scanning in an MS according to another embodiment of the present invention.

When the MS determines the performance or non-performance of L2 scanning considering the L1 scanning result, the MS may determine the performance or non-performance of L2 scanning as illustrated in FIG. 5 below.

FIG. 5 illustrates a procedure for determining the performance or non-performance of L2 scanning in an MS according to another embodiment of the present invention.

Referring to FIG. 5, after the MS performs the L1 scanning in block 301 of FIG. 3, the MS proceeds to block 501 and determines whether an SA preamble newly detected through the L1 scanning exists. That is, the MS determines whether an SA preamble added to an SA-preamble monitoring set through the L1 scanning exists.

If the SA preamble newly detected through the L1 scanning does not exist, the MS jumps to block 505 and determines a variance of a reception environment of a $k^{th}$ SA preamble among SA preambles again detected through the L1 scanning. For example, if a preamble index of a $k^{th}$ SA preamble is equal to 'i', the MS calculates a variance of a reception environment of the $k^{th}$ SA preamble whose preamble index is equal to using Equation 1 above. Here, the 'k' is an index of an again detected preamble included in the SA-preamble monitoring set. The 'k' is set to '0' as an initial value.

Alternatively, if the SA preamble newly detected through the L1 scanning exists, the MS proceeds to block 503 and adds the newly detected SA preamble to an L2 scanning set.

The MS then proceeds to block 505 and determines a variance of a reception environment of a $k^{th}$ SA preamble among SA preambles again detected through the L1 scanning. For example, when a preamble index of a $k^{th}$ SA preamble is equal to the MS calculates a variance of a reception environment of the $k^{th}$ SA preamble whose preamble index is equal to T using Equation 1 above.

After determining the variance of the reception environment of the $k^{th}$ SA preamble, the MS proceeds to block 507 and compares the variance of the reception environment of the $k^{th}$ SA preamble with a threshold variation so as to determine the performance or non-performance of L2 scanning for the $k^{th}$ SA preamble.

If the variance of the reception environment of the $k^{th}$ SA preamble is less than the threshold variation, the MS judges that it does not perform the L2 scanning for the $k^{th}$ SA preamble. Accordingly, the MS jumps to block 511 and determines whether it has judged the performance or non-performance of L2 scanning for all SA preambles again detected through the L1 scanning. For example, the MS compares a preamble index (k) of an again detected SA preamble with the whole number ($N_{MAX}$) of again detected SA preambles.

Alternatively, if the variance of the reception environment of the $k^{th}$ SA preamble is greater than or is equal to the threshold variation, the MS judges that it performs the L2 scanning for the $k^{th}$ SA preamble. Accordingly, the MS proceeds to block 509 and adds the $k^{th}$ SA preamble to the L2 scanning set.

The MS then proceeds to block 511 and determines whether it has judged the performance or non-performance of L2 scanning for all SA preambles again detected through the L1 scanning. For example, the MS compares a preamble index (k) of an again, detected SA preamble with the whole number ($N_{MAX}$) of again detected SA preambles.

If the preamble index (k) of the again detected SA preamble is less than or is equal to the whole number ($N_{MAX}$) of the again detected preambles, the MS recognizes that it fails to judge the performance or non-performance of L2 scanning for all SA preambles again detected. Accordingly, the MS proceeds to block 515 and updates the preamble index (k) of the again detected SA preamble (k++).

Next, the MS again proceeds to block 505 and determines the variance of the reception environment of the $k^{th}$ SA preamble among the SA preambles again detected through the L1 scanning. Here, the 'k' represents the preamble index updated in block 515.

Alternatively, if the preamble index (k) of the again detected SA preamble is greater than the whole number ($N_{MAX}$) of the again detected preambles, the MS recognizes that it judges the performance or non-performance of L2 scanning for all SA preambles again detected. Accordingly, the MS proceeds to block 513 and determines whether an SA preamble needing the L2 scanning exists in the L2 scanning set.

If the SA preamble for the L2 scanning exists in the L2 scanning set, the MS proceeds to block 305 of FIG. 3 and performs the L2 scanning for the SA preamble included in the L2 scanning set.

Alternatively, if the SA preamble for the L2 scanning does not exist in the L2 scanning set, the MS terminates the procedure according to the embodiment of the present invention. At this time, the MS performs next L1 scanning according to the L1 scanning pattern.

Figure 6:
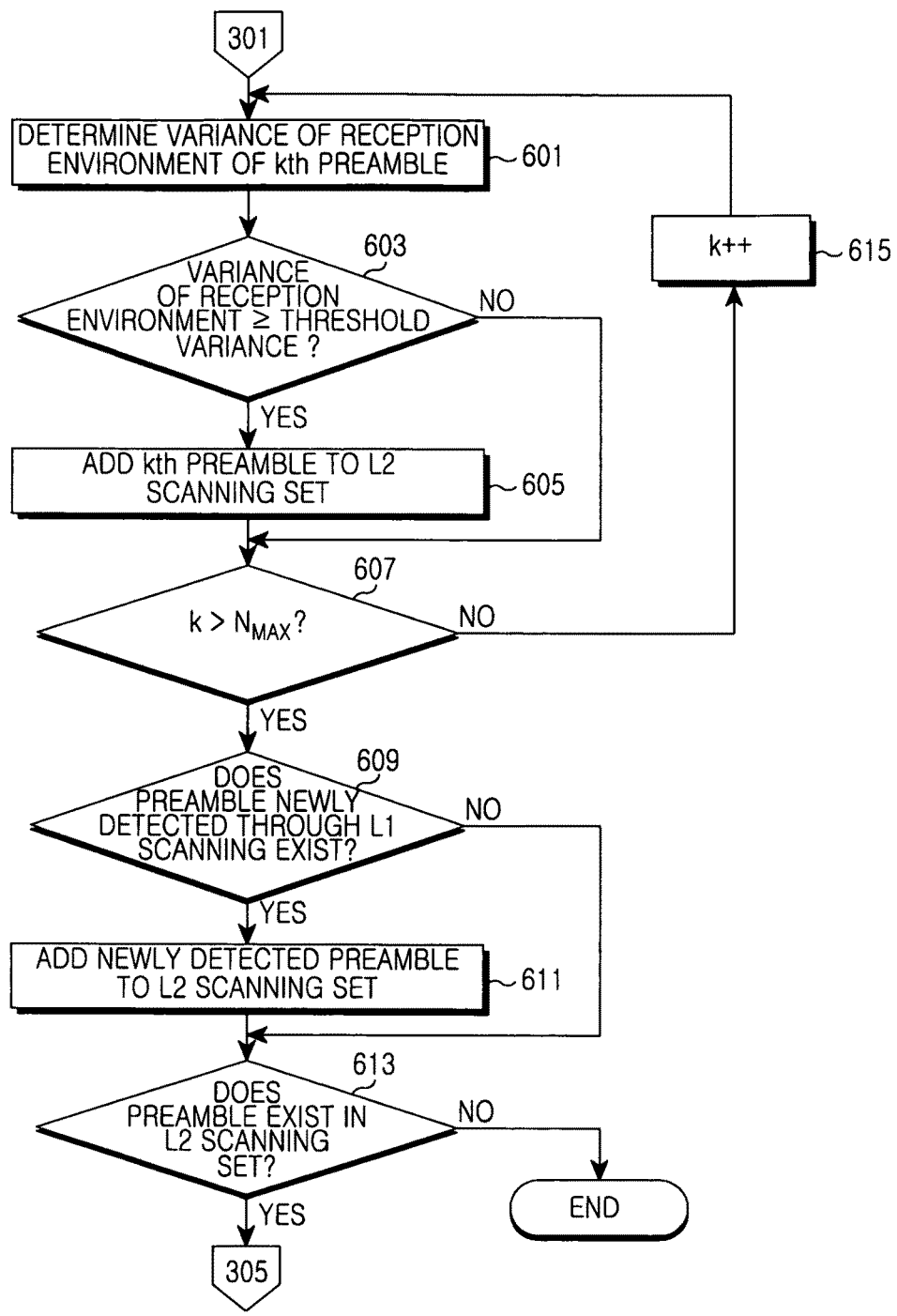
FIG. 6 illustrates a procedure for determining the performance or non-performance of L2 scanning in an MS according to a further embodiment of the present invention.
Figure 7:
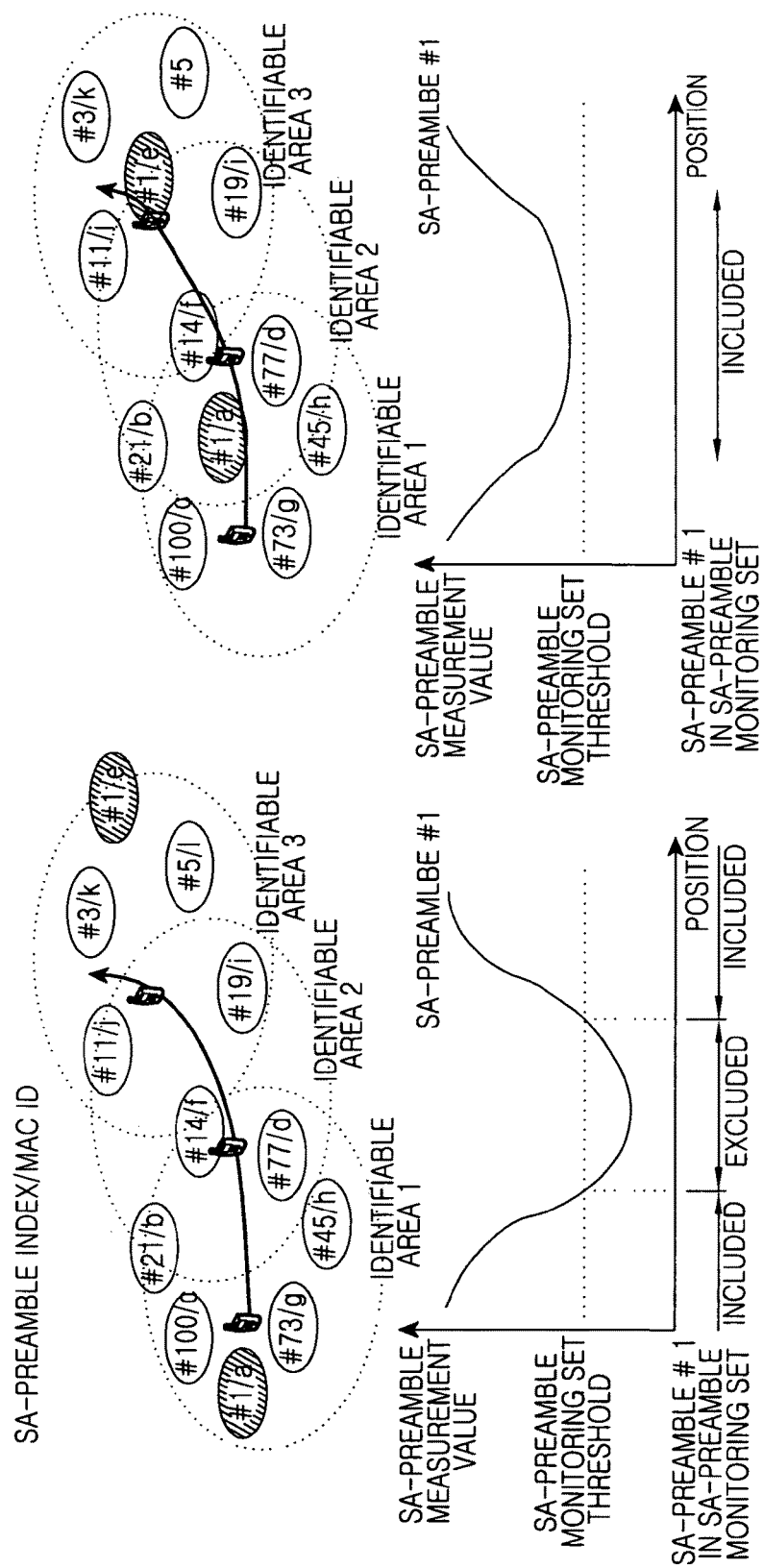
FIGS. 7A and 7B illustrate a construction for determining the performance or non-performance of L2 scanning in an MS according to an embodiment of the present invention.

When the MS determines the performance or non-performance of L2 scanning considering the L1 scanning result, the MS may determine the performance or non-performance of L2 scanning as illustrated in FIG. 6 below.

FIG. 6 illustrates a procedure for determining the performance or non-performance of L2 scanning in an MS according to an embodiment of the present invention.

Referring to FIG. 6, after the MS performs the L1 scanning in block 301 of FIG. 3, the MS proceeds to block 601 and identifies a variance of a reception environment of a $k^{th}$ SA preamble among SA preambles again detected through the L1 scanning. For example, when a preamble index of a $k^{th}$ SA preamble is equal to 'i', the MS calculates a variance of a reception environment of the $k^{th}$ SA preamble whose preamble index is equal to 'i' using Equation 1 above.

The MS then proceeds to block 603 and compares the variance of the reception environment of the $k^{th}$ SA preamble with a threshold variation so as to determine the performance or non-performance of L2 scanning for the $k^{th}$ SA preamble.

If the variance of the reception environment of the $k^{th}$ SA preamble is less than the threshold variation, the MS judges that it does not perform the L2 scanning for the $k^{th}$ SA preamble. Accordingly, the MS jumps to block 607 and determines whether it has judged the performance or non-performance of L2 scanning for all SA preambles again detected through the L1 scanning. For example, the MS compares a preamble index (k) of an again detected SA preamble with the whole number ($N_{MAX}$) of again detected SA preambles.

Alternatively, if the variance of the reception environment of the $k^{th}$ SA preamble is greater than or is equal to the threshold variation, the MS judges that it performs the L2 scanning for the $k^{th}$ SA preamble. Accordingly, the MS proceeds to block 605 and adds the $k^{th}$ SA preamble to an L2 scanning set.

The MS then proceeds to block 607 and determines whether it has judged the performance or non-performance of L2 scanning for all SA preambles again detected through the L1 scanning. For example, the MS compares a preamble index (k) of an again detected SA preamble with the whole number ($N_{MAX}$) of again detected SA preambles.

If the preamble index (k) of the again detected SA preamble is less than or is equal to the whole number ($N_{MAX}$) of the again detected preambles, the MS recognizes that it fails to judge the performance or non-performance of L2 scanning for all SA preambles again detected. Accordingly, the MS proceeds to block 615 and updates the preamble index (k) of the again detected SA preamble (k++).

Next, the MS again proceeds to block 601 and determines the variance of the reception environment of the $k^{th}$ SA preamble among the SA preambles again detected through the L1 scanning. Here, the $k^{th}$ represents the preamble index updated in block 615.

Alternatively, if the preamble index (k) of the again detected SA preamble is greater than the whole number ($N_{MAX}$) of the again detected preambles, the MS recognizes that it judges the performance or non-performance of L2 scanning for all SA preambles again detected. Accordingly, the MS proceeds to block 609 and determines whether an SA preamble newly detected through the L1 scanning exists. That is, the MS determines whether an SA preamble added to an SA-preamble monitoring set through the L1 scanning exists.

If the SA preamble added to the SA-preamble monitoring set through the L1 scanning does not exist, the MS jumps to block 613 and determines whether an SA preamble needing the L2 scanning exists in the L2 scanning set.

Alternatively, if the SA preamble newly detected through the L1 scanning exists, the MS proceeds to block 611 and adds the newly detected SA preamble to the L2 scanning set.

In block 613, the MS determines whether the SA preamble needing the L2 scanning exists in the L2 scanning set.

If the SA preamble for the L2 scanning exists in the L2 scanning set, the MS proceeds to block 305 of FIG. 3 and performs the L2 scanning for the SA preamble included in the L2 scanning set.

Alternatively, if the SA preamble for the L2 scanning does not exist in the L2 scanning set, the MS terminates the procedure according to the embodiment of the present invention. At this time, the MS performs next L1 scanning according to the L1 scanning pattern.

The following description is made for a construction of an MS for performing L1 scanning and L2 scanning.

Figure 8:
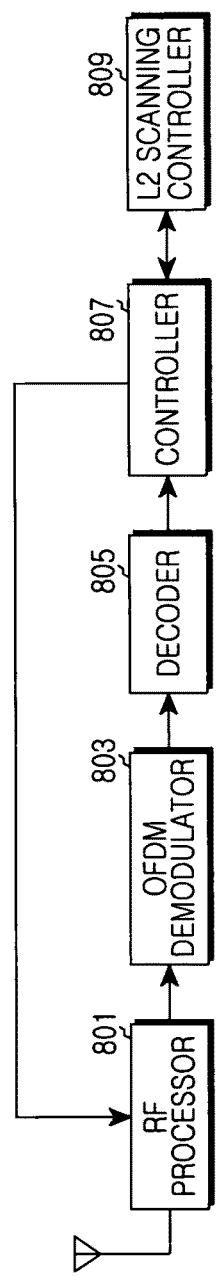
FIG. 8 illustrates a construction of an MS in a wireless communication system where a macro cell and a femto cell coexist according to an embodiment of the present invention.

FIG. 8 illustrates a construction of an MS in a wireless communication system in which a macro cell and a femto cell coexist according to an embodiment of the present invention.

As illustrated in FIG. 8, the MS includes an RF processor 801, an Orthogonal Frequency Division Multiplexing (OFDM) demodulator 803, a decoder 805, a controller 807, and an L2 scanning controller 809.

The RF processor 801 converts a Radio Frequency (RF) signal received through an antenna into a baseband signal, and converts the baseband signal into digital sample data. At this time, the RF processor 801 performs a transition of an operation FA under the control of the controller 807.

The OFDM demodulator 803 OFDM-demodulates sample data from the RF processor 801 and outputs frequency domain data. Here, the OFDM demodulation is meaning including Cyclic Prefix (CP) elimination, Fast Fourier Transform (FFT) operation, and such.

The decoder 805 demodulates and decodes data provided from the OFDM demodulator 803 according to a corresponding modulation level.

The controller 807 controls L1 scanning and L2 scanning of the MS. For example, if it is an L1 scanning duration according to an L1 scanning pattern, the controller 807 converts an operation FA of the MS into an FA of a neighbor BS intended to search. The controller 807 acquires L1 information of the neighbor BS from an SA preamble of the converted FA received from the decoder 805. Here, the L1 information includes a preamble index and an SA-preamble measurement value.

Also, when the L2 scanning controller 809 determines to perform the L2 scanning, the controller 807 controls the L2 scanning controller 809 to perform the L2 scanning for SA preambles detected through the L1 scanning. In detail, the controller 807 acquires L2 information of a BS from an SFH of the BS corresponding to an SA preamble for which the L2 scanning is judged to be necessary in the L2 scanning controller 809. Here, the L2 information includes a BS ID corresponding to a preamble index, a CSG ID, and such.

Also, the controller 807 determines an L1 scanning pattern and an L2 scanning pattern through a negotiation with a serving BS.

The L2 scanning controller 809 determines the performance or non-performance of L2 scanning using the L1 scanning result received from the controller 807. At this time, the L2 scanning controller 809 can determine the performance or non-performance of L2 scanning using any one of schemes of FIGS. 4 to 6. For example, when an SA preamble newly detected through L1 scanning exists, the L2 scanning controller 809 determines to perform L2 scanning for the newly detected SA preamble. In another example, the L2 scanning controller 809 determines the performance or non-performance of L2 scanning for each SA preamble considering a variance of a reception environment of each SA preamble again detected through L1 scanning. At this time, the L2 scanning controller 809 can calculate the variance of the reception environment of the SA preamble using Equation 1 above.

In the aforementioned embodiment, the RF processor 801 performs a transition of an FA under the control of the controller 807. In another embodiment, if an FFT operator within the OFDM demodulator 803 can process the whole band for multiple FA that an MS can support, the RF processor 801 may use one carrier.

As described above, if an MS hierarchically performs L1 scanning and L2 scanning, the L1 scanning and the L2 scanning can be either carried out according to the same scanning pattern, or can be carried out according to a different scanning pattern. In this example, the MS and a BS can perform a negotiation for an L1 scanning pattern and a negotiation for an L2 scanning pattern through a different process.

Figure 9:
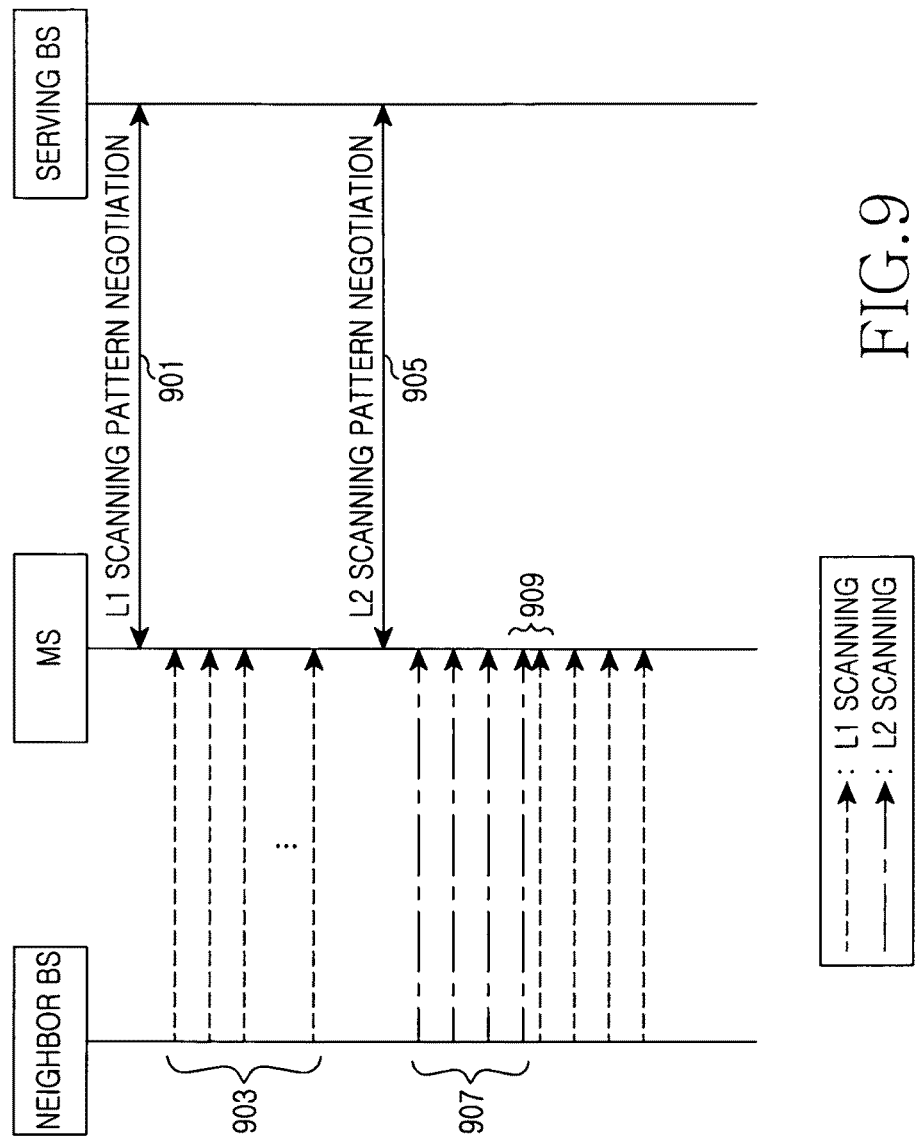
FIG. 9 illustrates a procedure of negotiating for an L1/L2 scanning pattern between an MS and a Base Station (BS) according to an embodiment of the present invention.

FIG. 9 illustrates a procedure of negotiating for an L1/L2 scanning pattern between an MS and a BS according to an embodiment of the present invention.

Referring to FIG. 9 an MS and a serving BS determine an L1 scanning pattern through an L1 scanning pattern negotiation 901 there between. For example, the MS and the serving BS determine an L1 scanning pattern in a network entry or re-entry process of the MS. In another example, the MS and serving BS may determine an L1 scanning pattern when transmitting/receiving a scanning request/response message after a network entry or re-entry of the MS.

If it is an L1 scanning duration according to the L1 scanning pattern determined through the negotiation with the serving BS, in step 903, the MS converts an operation FA into an FA of a neighbor BS intended to search, and performs L1 scanning.

If the L1 scanning is completed, the MS determines an L2 scanning pattern through an L2 scanning pattern negotiation 905 with the serving BS.

In step 907, the MS performs L2 scanning for an SA preamble, which needs the L2 scanning, according to the L2 scanning pattern determined through the negotiation with the serving BS. At this time, the L1 scanning pattern and the L2 scanning pattern are different from each other and thus, in step 909, the MS may perform the L1 scanning and the L2 scanning in a time overlapping manner.

Figure 10:
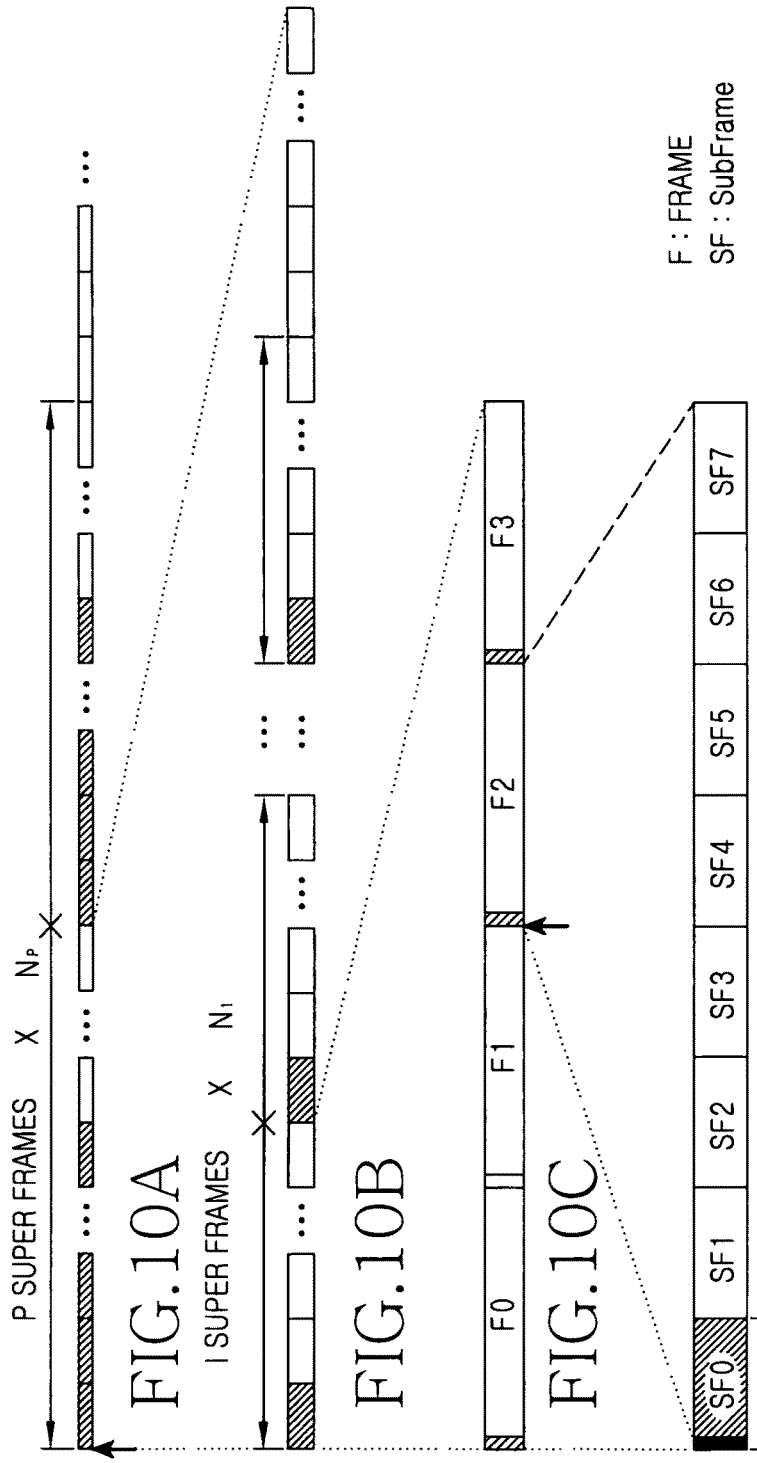
FIGS. 10A to 10D illustrate an L1 scanning pattern of an MS according to an embodiment of the present invention.

In the aforementioned embodiment, an MS and a serving BS can determine variables for setting scanning patterns through scanning pattern negotiations. For example, a variable for setting a scanning pattern includes a scanning start superframe, a scanning period, a scanning interval, a scanning duration, and such. In this example, the MS can set an L1 scanning pattern using the variable for setting the scanning pattern as illustrated in FIG. 10 below. Unlike this, the MS may apply the variable for setting the scanning pattern to setting of an L2 scanning pattern.

The following description is made on the assumption that an L1 scanning pattern is set on the basis of a frame structure defined in the IEEE 802.16m standard.

FIGS. 10A to 10D illustrate an L1 scanning pattern of an MS according to an embodiment of the present invention.

As illustrated in FIG. 10A, the MS initiates L1 scanning from a scanning start superframe (S). The MS then detects an SA preamble through the L1 scanning during a scanning period (P), and repeatedly measures the SA preamble to determine an SA preamble measurement value. At this time, the scanning period (P) is expressed in a unit of superframe. Also, the scanning period (P) is repeated at $N_P$ times.

As illustrated in FIG. 10B, the MS performs SA preamble detection or measurement at a scanning interval (I) determined through a negotiation with a serving BS during the scanning period (P). At this time, the scanning interval (I) is expressed in a unit of superframe. Also, the scanning interval (I) is repeated at $N_I$ times during the scanning period (P).

As illustrated in FIG. 10C, one superframe is composed of four frames (F0, F1, F2, and F3). Each frame is composed of eight subframes (SF0, SF1, SF2, SF3, SF4, SF5, SF6, and SF7). A first subframe of each frame includes a Primary Advanced (PA) preamble or an SA preamble.

When performing the L1 scanning, the MS detects and measures at least one SA preamble. At this time, the MS detects and measures the SA preamble included in a frame indicated by a preamble scanning indicator (0) determined through a negotiation with the serving BS. For example, if a preamble scanning indicator indicates a third frame (F2), the MS detects and measures an SA preamble included in a first subframe (SF0) of the third frame (F2).

As illustrated in FIG. 10D, the MS converts an operation FA in a unit of subframe and performs L1 scanning. At this time, the MS performs the L1 scanning during a scanning duration (D) determined through a negotiation with the serving BS. In detail, the MS converts the operation FA and performs the L1 scanning and while doing so, if the scanning duration (D) expires, the MS converts the operation FA into an FA of the serving BS and performs communication with the serving BS.

When an MS being in communication with a serving BS consumes in converting an operation FA for the sake of L1 scanning exceeds a Receive/transmit Transition Gap (RTG), the scanning duration (D) can be defined from a subframe earlier than a subframe including an SA preamble.

As described above, in a wireless communication system where a macro cell and a femto cell are mixed, a BS does not transmit a neighbor BS list for femto BSs to an MS. Accordingly, the MS cannot distinguish the femto BSs through only a preamble and thus, in order to distinguish the neighbor femto BSs, the MS performs L1 scanning for acquiring L1 information and L2 scanning for acquiring L2 information. At this time, the MS selectively performs the L2 scanning considering the L1 scanning results.

The L2 scanning represents a process in which an MS decodes an SFH of a BS to acquire L2 information of the BS. The SFH is divided into a Primary-SFH Information Element (P-SFH IE) and a Secondary (S)-SFH IE. The P-SFH IE is transmitted every superframe, and the S-SFH IE is transmitted including a different type of Sub Packet (SP) every superframe. At this time, through the L2 scanning, the MS has to acquire the SP including the L2 information of the BS. Here, the SP has, by type, different information, a different transmission time point, and a different transmission period. In the following description, an SPx represents an SP including information, which is intended to acquire through the L2 scanning, among the L2 information of the BS.

Through an SFH, a BS transmits an essential system parameter and system configuration information to an MS. Thus, if an MS performs L2 scanning but fails to receive an SFH of a serving BS, the MS cannot perform communication with the serving BS during a superframe for which the MS fails to receive the SFH.

In order to reduce a period of time of interruption of communication with the serving BS, the MS performs the L2 scanning as follows. In the following description, the assumption is that a transmission pattern of an S-SFH IE (i.e., a transmission time point by SP type) is defined in the standard, or is acquired by an MS through a network entry/re-entry process of the MS.

Figure 11:
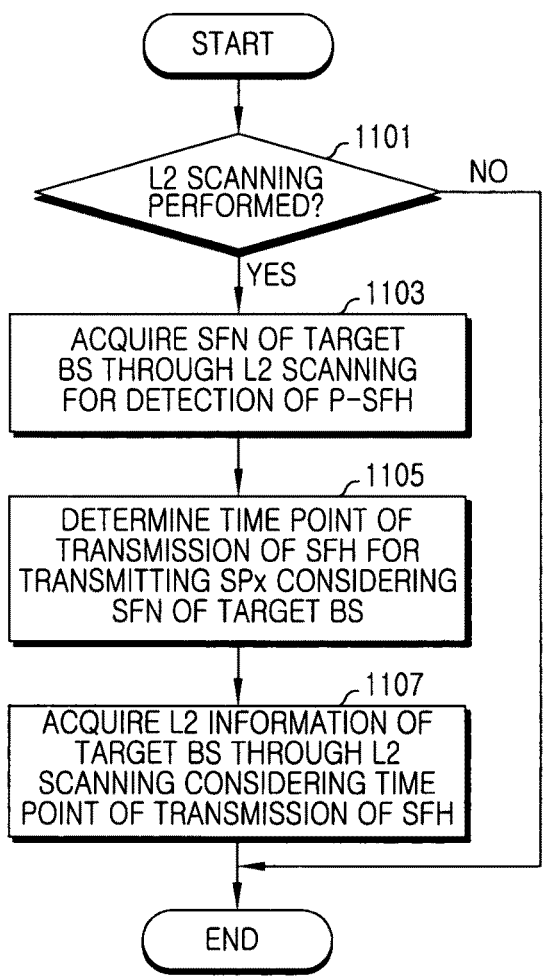
FIG. 11 illustrates an L2 scanning procedure of an MS according to an embodiment of the present invention.

If a SuperFrame Number (SFN) of a serving BS of an MS is not synchronized with an SFN of a neighbor BS (i.e., a target BS), the MS performs L2 scanning as illustrated in FIG. 11 below. Here, that the SFN of the serving BS of the MS is not synchronized with the SFN of the neighbor BS represents that in a physical synchronization between the serving BS and the neighbor BS is maintained but superframe counters thereof are different from each other.

FIG. 11 illustrates an L2 scanning procedure of an MS according to an embodiment of the present invention.

Referring to FIG. 11, in block 1101, the MS determines whether to perform L2 scanning considering L1 scanning result. For example, the MS determines whether to perform L2 scanning using any one of schemes of FIGS. 4 to 6.

If the MS does not perform the L2 scanning, the MS terminates the procedure according to an embodiment of the present invention.

Alternatively, if the MS performs the L2 scanning, the MS proceeds to block 1103 and detects a P-SFH of a neighbor BS (i.e., a target BS) through the L2 scanning during an arbitrary time duration, thus acquiring an SFN of the neighbor BS. For example, the MS acquires an SFN of a neighbor BS through first L2 scanning as indicated by reference numeral 1300 of FIG. 13A.

The MS then proceeds to block 1105 and determines a time point of transmission of an SFH at which the neighbor BS transmits an SPx, using the acquired SFN of the neighbor BS. For example, the type of an SP included in an S-SFH is determined by an SFN of the super frame including the S-SFH. Accordingly, the MS determines a time point of transmission of an SFH at which the neighbor BS transmits an SPx, using the acquired SFN of the neighbor BS. In another example, the type of an SP included in an S-SFH may be determined by both an SFN of the neighbor BS transmitting the S-SFH and a preamble index of the neighbor BS. Accordingly, the MS may determine a time point of transmission of an SFH at which the neighbor BS transmits an SPx, considering both the acquired SFN of the neighbor BS and the preamble index of the neighbor BS. Here, the MS can acquire the preamble index of the neighbor BS through L1 scanning.

After determining the time point of transmission of the SFH at which the neighbor BS transmits the SPx, the MS proceeds to block 1107 and acquires L2 information of the neighbor BS through L2 scanning for the neighbor BS selectively only at the time point of transmission of the SFH at which the neighbor BS transmits the SPx. In detail, the MS determines an L2 scanning duration such that the MS performs the L2 scanning for the neighbor BS selectively only at the time point of transmission of the SFH at which the neighbor BS transmits the SPx. Afterwards, during the L2 scanning duration, the MS acquires the L2 information of the neighbor BS through the L2 scanning. For example, the MS acquires L2 information of the neighbor BS through L2 scanning for the neighbor BS selectively only at a time point of transmission of an SFH at which a neighbor BS transmits an SPx as indicated by reference numeral 1310 of FIG. 13A. At this time, the BS transmits the SPx through twice repetition. Accordingly, the MS scans the SPx through twice repetition.

The MS then terminates the procedure according to an embodiment of the present invention.

In the aforementioned embodiment, if an SFN of a serving BS of an MS is not synchronized with and an SFN of a neighbor BS, the MS performs L2 scanning according to the above description.

Figure 12:
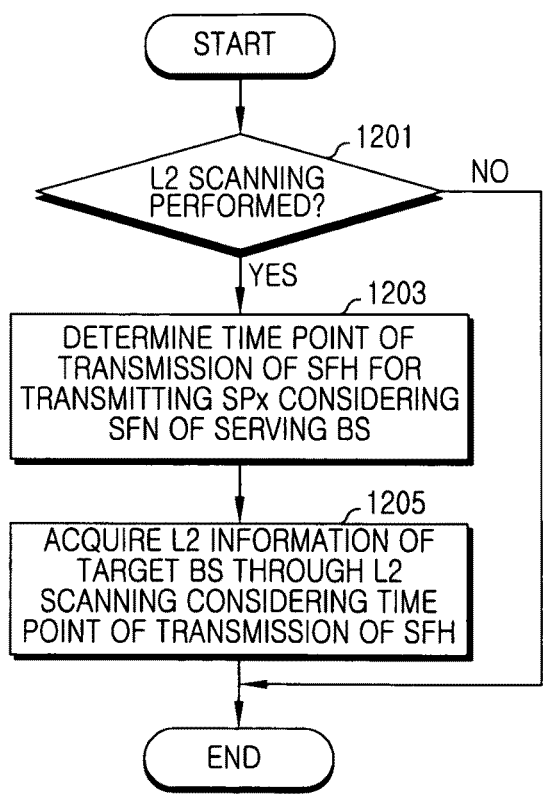
FIG. 12 illustrates an L2 scanning procedure of an MS according to an embodiment of the present invention.

In another embodiment, if an SFN of a serving BS of an MS is synchronized with an SFN of a neighbor BS, the MS performs L2 scanning as illustrated in FIG. 12 below.

FIG. 12 illustrates an L2 scanning procedure of an MS according to another embodiment of the present invention.

Referring to FIG. 12, in block 1201, the MS determines whether to perform L2 scanning considering L1 scanning result. For example, the MS determines whether to perform L2 scanning using any one of schemes of FIGS. 4 to 6.

When the MS does not perform the L2 scanning, the MS terminates the procedure according to the embodiment of the present invention.

Alternatively, if the MS performs the L2 scanning, the MS proceeds to block 1203 and determines a time point of transmission of an SFH at which a neighbor BS (i.e., a target BS) transmits an SPx, using an SFN of a serving BS. For example, an SFN of a serving BS is synchronized with an SFN of a neighbor BS and thus, the MS determines a time point of transmission of an SFH at which the neighbor BS transmits an SPx, using the SFN of the serving BS. In another example, the MS may determine a time point of transmission of an SFH at which the neighbor BS transmits an SPx, considering both an SFN of the serving BS and a preamble index of an L2 scanning targeted neighbor BS acquired through L1 scanning.

Figure 13A:
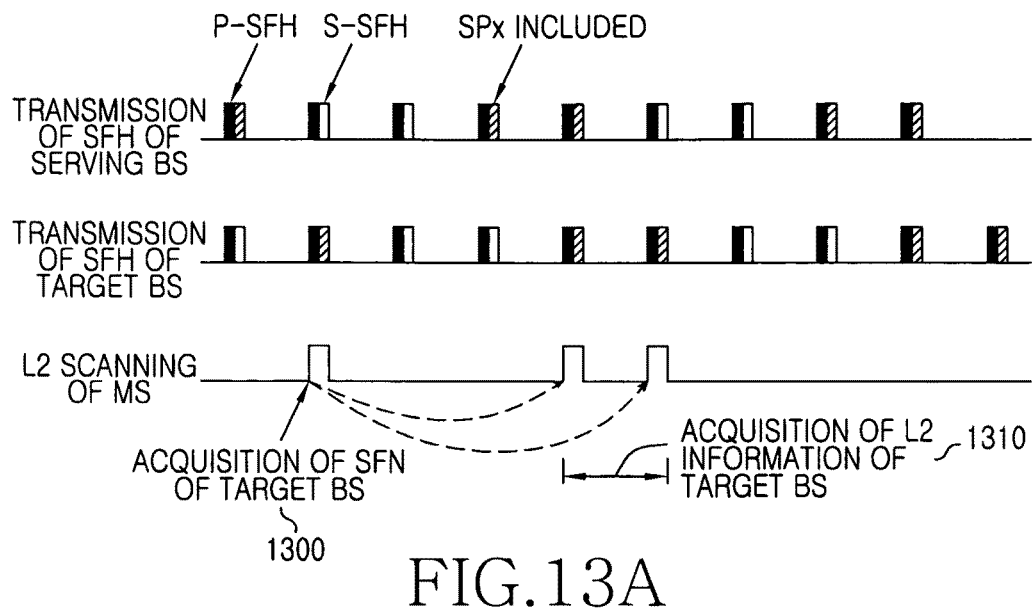
FIGS. 13A and 13B illustrate an L1 scanning pattern of an MS according to an embodiment of the present invention.
Figure 13B:
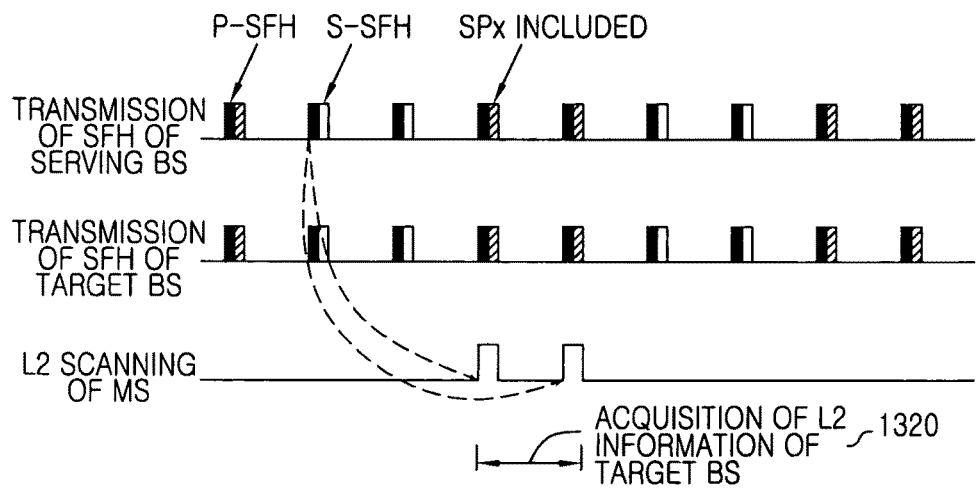

After determining the time point of transmission of the SFH at which the neighbor BS transmits the SPx, the MS proceeds to block 1205 and acquires L2 information of the neighbor BS through L2 scanning for the neighbor BS selectively only at the time point of transmission of the SFH at which the neighbor BS transmits the SPx. In detail, the MS determines an L2 scanning duration such that the MS performs the L2 scanning for the neighbor BS selectively only at the time point of transmission of the SFH at which the neighbor BS transmits the SPx. Afterwards, during the L2 scanning duration, the MS acquires the L2 information of the neighbor BS through the L2 scanning. For example, as illustrated in FIG. 13B, the MS determines a time point of transmission of an SFH at which a neighbor BS transmits an SPx considering an SFN of a serving BS. As indicated by reference numeral 1320 of FIG. 13B, the MS then acquires L2 information of the neighbor BS through L2 scanning for the neighbor BS selectively only at the time point of transmission of the SFH at which the neighbor BS transmits the SPx. At this time, the BS transmits the SPx through twice repetition. Accordingly, the MS scans the SPx through twice repetition.

The MS then terminates the procedure according to the embodiment of the present invention.

In the aforementioned embodiment, an MS determines an L2 scanning duration considering a time point of transmission of an SFH at which a neighbor BS transmits an SPx such that the MS can perform L2 scanning selectively only at the time point at which the neighbor BS transmits the SPx.

In another embodiment, an MS performs L2 scanning as follows such that the contents of an SFH of a serving BS is not changed in order to more reduce a period of time of interruption of communication with the serving BS.

Figure 14:
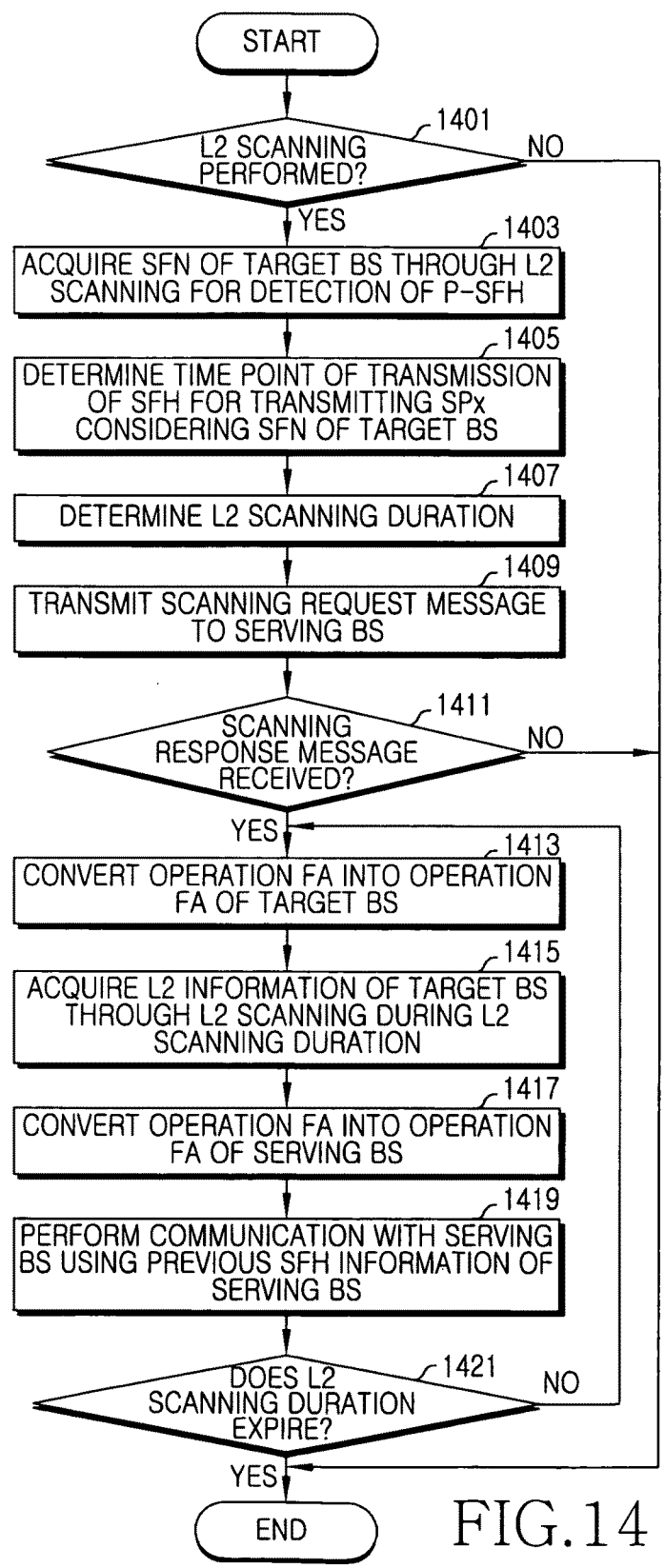
FIG. 14 illustrates a procedure for acquiring a SuperFrame Header (SFH) of a serving BS in an MS according to an embodiment of the present invention.

If an SFN of a serving BS of an MS is not synchronized with an SFN of a neighbor BS, the MS performs L2 scanning as illustrated in FIG. 14 below.

FIG. 14 illustrates a procedure for acquiring an SFH of a serving BS in an MS according to an embodiment of the present invention.

Referring to FIG. 14, in block 1401, the MS determines whether to perform L2 scanning considering L1 scanning result. For example, the MS determines whether to perform L2 scanning using any one of schemes of FIGS. 4 to 6.

When the MS does not perform the L2 scanning, the MS terminates the procedure according to the embodiment of the present invention.

Alternatively, when the MS performs the L2 scanning, the MS proceeds to block 1403 and detects a P-SFH of a neighbor BS (i.e., a target BS) through the L2 scanning during an arbitrary time duration, thus acquiring an SFN of the neighbor BS.

The MS proceeds to block 1405 and determines a time point of transmission of an SFH at which the neighbor BS transmits an SPx, using the acquired SFN of the neighbor BS. In another example, the MS may determine a time point of transmission of an SFH at which the neighbor BS transmits an SPx, considering both an SFN of the neighbor BS and a preamble index of the neighbor BS. Here, the MS can acquire the preamble index of the neighbor BS through L1 scanning.

After determining the time point of transmission of the SFH at which the neighbor BS transmits the SPx, the MS proceeds to block 1407 and determines an L2 scanning duration considering the time point of transmission of the SFH at which the neighbor BS transmits the SPx. In detail, the MS determines the L2 scanning duration such that the MS selectively performs L2 scanning only for a superframe in which the neighbor BS transmits the SPx. For example, if the MS determines to perform L2 scanning as indicated by reference numeral 1800 of FIG. 18A, the MS determines an L2 scanning duration considering a time point of transmission of an SFH at which the neighbor BS transmits an SPx.

After determining the L2 scanning duration, the MS proceeds to block 1409 and transmits a scanning request message to a serving BS. At this time, the MS includes the determined L2 scanning duration information in the scanning request message, and transmits the scanning request message including the L2 scanning duration information to the serving BS.

The MS proceeds to block 1411 and determines whether a scanning response message is received from the serving BS.

If the scanning response message is not received from the serving BS during a constant time, the MS judges that the serving BS does not accept the L2 scanning. Accordingly, the MS terminates the procedure according to the embodiment of the present invention.

Alternatively, if the scanning response message is received from the serving BS, the MS judges that the serving BS does not change the contents of an SFH during the L2 scanning duration determined in block 1407. Accordingly, the MS proceeds to block 1413 and, if the L2 scanning duration arrives, converts its own operation frequency (FA) into an operation frequency of the neighbor BS which will perform the L2 scanning.

The MS proceeds to block 1415 and receives the SPx transmitted by the neighbor BS, thus acquiring L2 information of the neighbor BS.

After acquiring the L2 information of the neighbor BS, the MS proceeds to block 1417 and converts its own operation frequency into an operation frequency of the serving BS.

After converting the operation frequency, the MS proceeds to block 1419 and performs communication with the serving BS using the contents of an SFH previously received from the serving BS. At this time, the MS performs communication with the serving BS using the contents of the latest SFH received from the serving BS.

Next, the MS proceeds to block 1421 and determines whether the L2 scanning duration expires.

If the L2 scanning duration does not expire, the MS returns to block 1413 and converts its own operation frequency into the operation frequency of the neighbor BS which will perform the L2 scanning. That is, the MS repeatedly performs blocks 1413 to 1419 during the L2 scanning duration.

Alternatively, if the L2 scanning duration expires, the MS terminates the procedure according to the embodiment of the present invention.

Figure 18A:
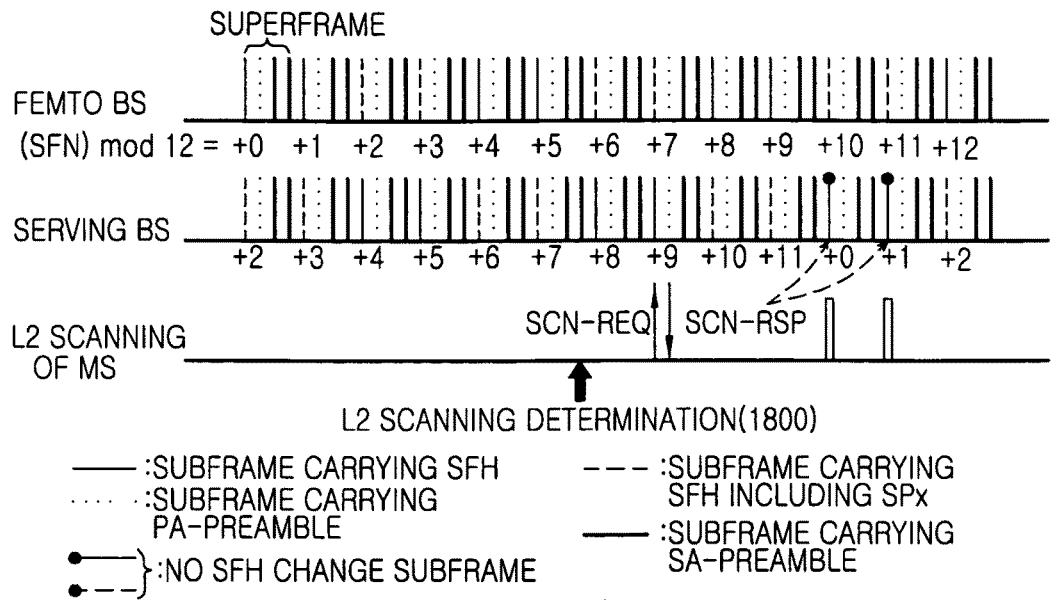
FIGS. 18A to 18C illustrate an L2 scanning pattern of an MS according to an embodiment of the present invention.
Figure 18B:
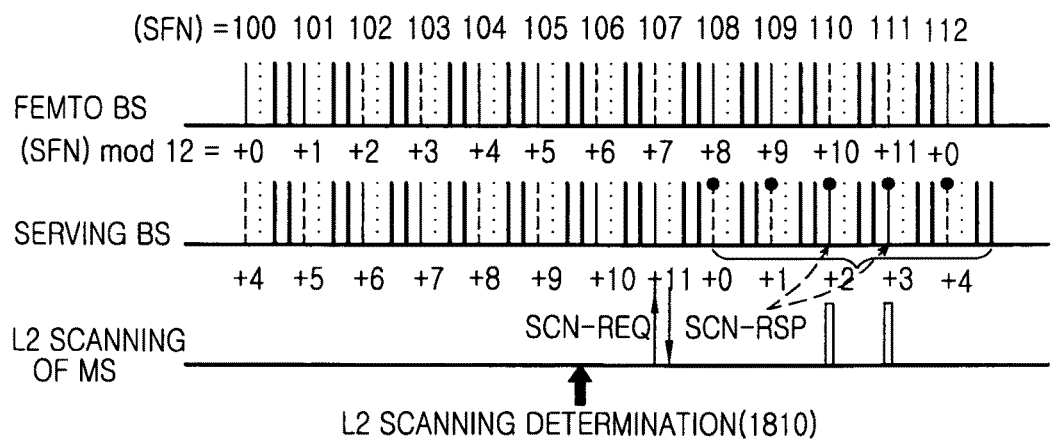
Figure 18C:
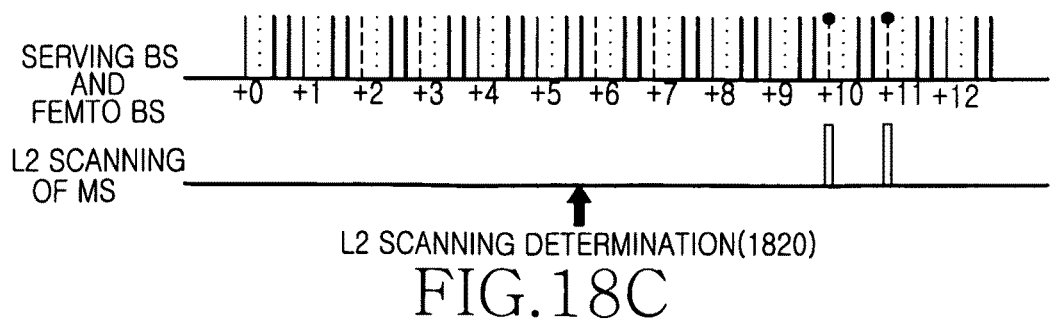

In the aforementioned embodiment, if a serving BS receives a scanning request message from an MS, the serving BS judges whether to change the contents of an SFH during an L2 scanning duration of the MS. When the serving BS does not change the contents of the SFH during the L2 scanning duration, the serving BS transmits a scanning response message of permitting L2 scanning of the MS, to the MS. That is, the serving BS does not change the contents of the SFH during the duration for which the MS performs the L2 scanning as illustrated in FIG. 18A.

In the aforementioned embodiment, an MS judges if a serving BS accepts L2 scanning according to whether a scanning response message is received from the serving BS during a constant time.

In another embodiment, an MS may judge if a serving BS accepts L2 scanning through the contents of a scanning response message received from the serving BS.

In the aforementioned embodiment, a serving BS does not change the contents of an SFH during an L2 scanning duration of an MS so as to reduce a period of time of interruption of communication with the MS resulting from L2 scanning of the MS.

In another embodiment, an MS determines an L2 scanning duration considering a duration for which a serving BS does not change the contents of an SFH.

Figure 15:
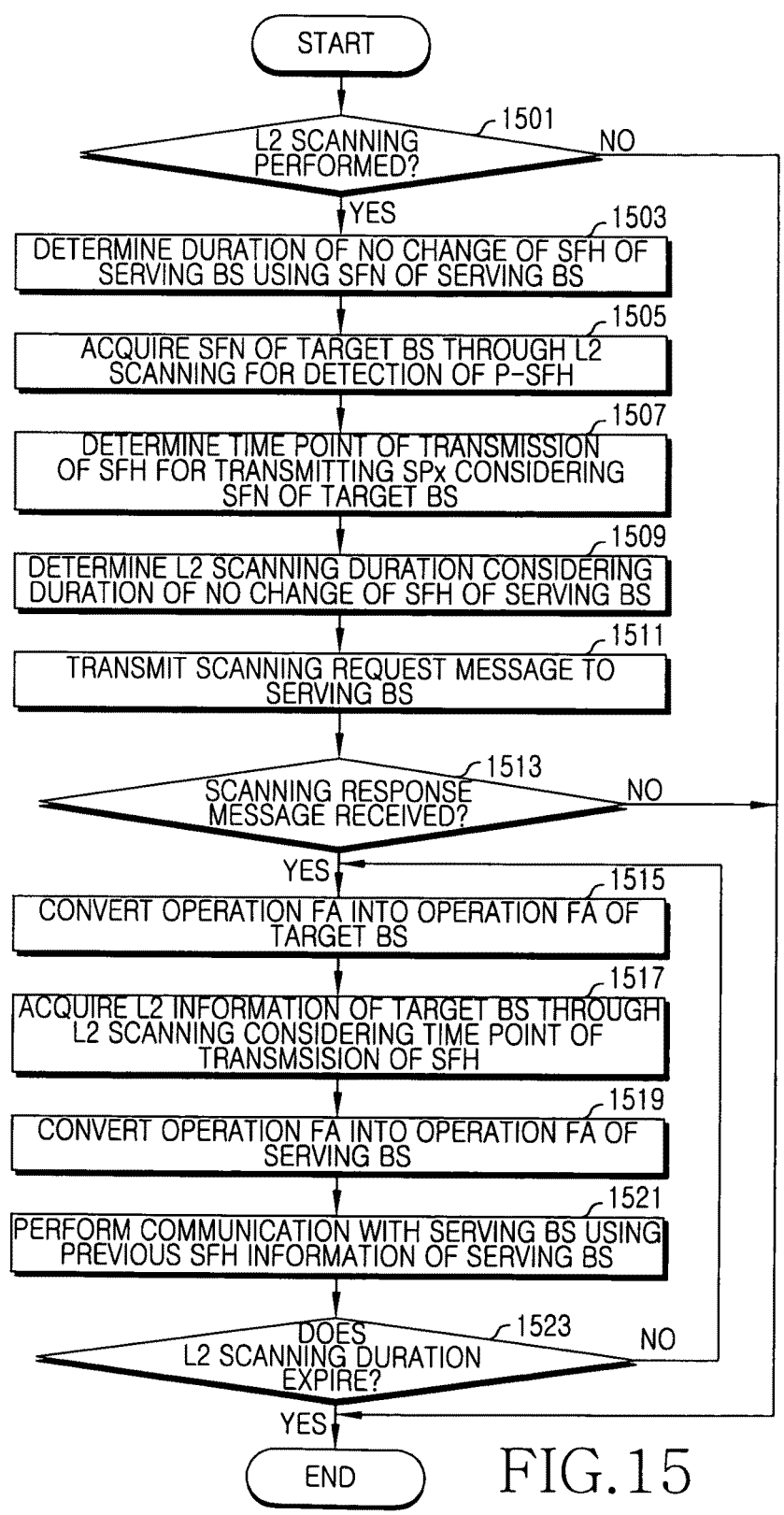
FIG. 15 illustrates a procedure for acquiring an SFH of a serving BS in an MS according to an embodiment of the present invention.

FIG. 15 illustrates a procedure for acquiring an SFH of a serving BS in an MS according to another embodiment of the present invention.

Referring to FIG. 15, in block 1501, the MS determines whether to perform L2 scanning considering L1 scanning result. For example, the MS determines whether to perform L2 scanning using any one of schemes of FIGS. 4 to 6.

If the MS does not perform the L2 scanning, the MS terminates the procedure according to the embodiment of the present invention.

Alternatively, if the MS performs the L2 scanning, the MS proceeds to block 1503 and determines a duration for which a serving BS does not change the contents of an SFH using an SFN of the serving BS. Here, a rule for the duration for which the serving BS does not change the contents of the SFH can be defined in a system standard, or can be defined by system configuration information.

The MS proceeds to block 1505 and detects a P-SFH of a neighbor BS (i.e., a target BS) through the L2 scanning during an arbitrary time duration, thus acquiring an SFN of the neighbor BS.

After acquiring the SFN of the neighbor BS which will the L2 scanning, the MS proceeds to block 1507 and determines a time point of transmission of an SFH at which the neighbor BS transmits an SPx, using the acquired SFN of the neighbor BS. In another example, the MS may determine a time point of transmission of an SFH at which the neighbor BS transmits an SPx, considering both an SFN of the neighbor BS and a preamble index of the neighbor BS. Here, the MS can acquire the preamble index of the neighbor BS through L1 scanning.

After determining the time point of transmission of the SFH at which the neighbor BS transmits the SPx, the MS proceeds to block 1509 and determines an L2 scanning duration considering both the duration for which the serving BS does not change the contents of the SFH and the time point of transmission of the SFH at which the neighbor BS transmits the SPx. In detail, the MS determines the L2 scanning duration such that the MS selectively performs L2 scanning only for a superframe in which the neighbor BS transmits the SPx. For example, FIG. 18B assumes that a serving BS does not change the contents of an SFH in superframes that include SFNs satisfying '0', '1', '2', '3', and '4' with respect to a modulo operation '12' (i.e., SFNs satisfying the Equation of (SFN) mod '12'='0', '1', '2', '3', and '4'), and a neighbor BS transmits an S-SFH including an SPx in superframes that include SFNs satisfying '3' and '4' with respect to a modulo operation '4' (i.e., SFNs satisfying the Equation of (SFN) mod '4'='3' and '4'). In this example, the MS determines, as an L2 scanning duration, superframes that include SFNs (110 and 111 of FIG. 18B) of a neighbor BS in which a duration for which the serving BS does not change the contents of the SFH overlaps with a time point of transmission of the SFH at which the neighbor BS transmits the SPx.

After determining the L2 scanning duration, the MS proceeds to block 1511 and transmits a scanning request message to the serving BS. At this time, the MS includes the determined L2 scanning duration information in the scanning request message, and transmits the scanning request message including the L2 scanning duration information to the serving BS.

The MS proceeds to block 1513 and determines whether a scanning response message is received from the serving BS.

If the scanning response message is not received from the serving BS during a constant time, the MS judges that the serving BS does not accept the L2 scanning. Accordingly, the MS terminates the procedure according to the embodiment of the present invention.

Alternatively, if the scanning response message is received from the serving BS, the MS judges that the serving BS does not change the contents of the SFH during the L2 scanning duration determined in block 1509. Accordingly, the MS proceeds to block 1515 and, if the L2 scanning duration arrives, converts its own operation frequency into an operation frequency of the neighbor BS which will perform the L2 scanning.

The MS proceeds to block 1517 and receives the SPx transmitted by the neighbor BS, thus acquiring L2 information of the neighbor BS.

After acquiring the L2 information of the neighbor BS, the MS proceeds to block 1519 and converts its own operation frequency into an operation frequency of the serving BS.

After the MS converts the operation frequency, the MS proceeds to block 1521 and performs communication with the serving BS using the contents of an SFH previously received from the serving BS. At this time, the MS performs communication with the serving BS using the contents of the latest SFH received from the serving BS.

Next, the MS proceeds to block 1523 and determines whether the L2 scanning duration expires.

If the L2 scanning duration does not expire, the MS returns to block 1515 and converts its own operation frequency into the operation frequency of the neighbor BS which will perform the L2 scanning. That is, the MS repeatedly performs blocks 1515 to 1521 during the L2 scanning duration.

Alternatively, if the L2 scanning duration expires, the MS terminates the procedure according to the embodiment of the present invention.

In the aforementioned embodiment, when an SPx is transmitted through two continuous superframes within an SPx transmission period, a serving BS sets a duration not capable of changing the contents of an SFH, to a "SPx transmission period+superframe". In another embodiment, a serving BS may set a duration not capable of changing the contents of an SFH, to a double of the maximum SPx transmission period according to an SPx transmission pattern.

In the aforementioned embodiment, when an SFN of a serving BS is not synchronized with an SFN of a neighbor BS, an MS determines an L2 scanning duration considering a duration for which the serving BS does not change the contents of an SFH.

Figure 16:
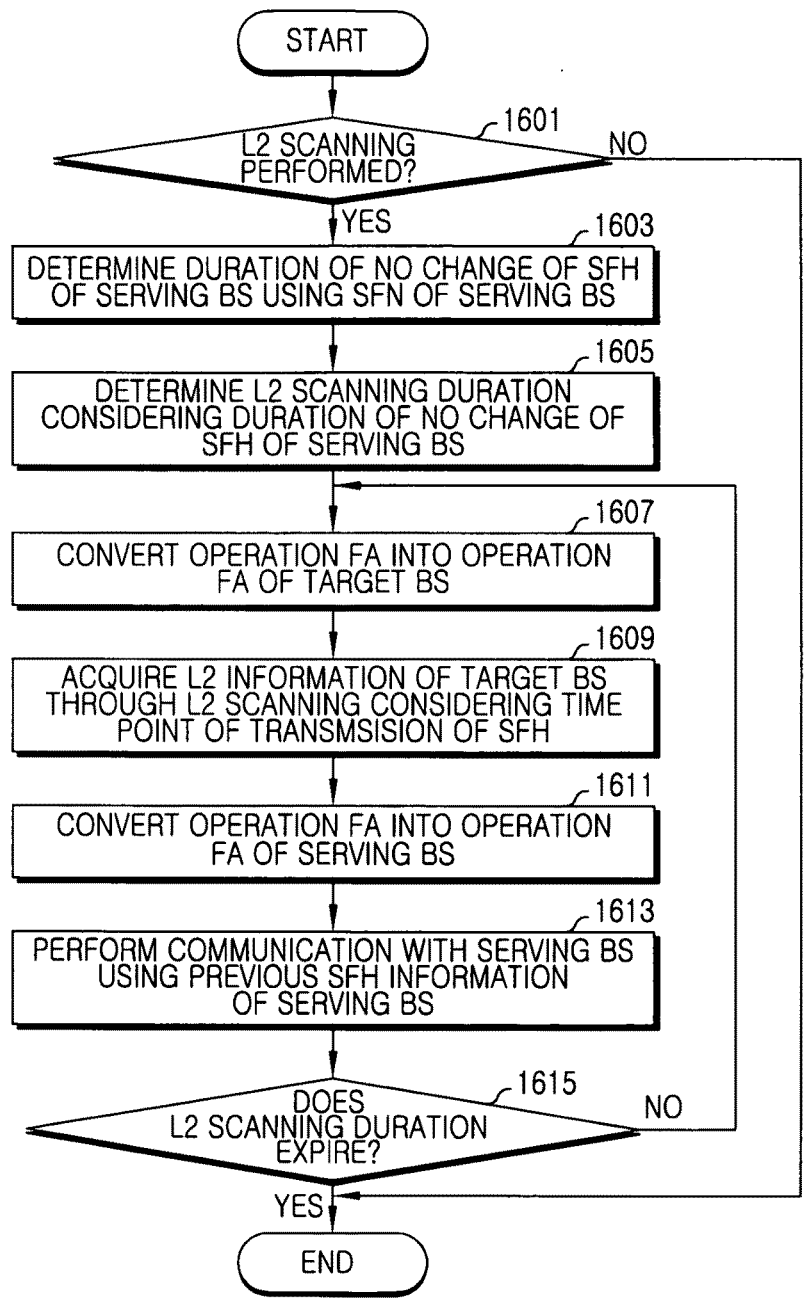
FIG. 16 illustrates a procedure for acquiring an SFH of a serving BS in an MS according to an embodiment of the present invention.

In another embodiment, when an SFN of a serving BS of an MS is synchronized with an SFN of a neighbor BS, the MS determines an L2 scanning duration considering a duration for which the serving BS does not change the contents of an SFH as illustrated in FIG. 16 below.

FIG. 16 illustrates a procedure for acquiring an SFH of a serving BS in an MS according to an embodiment of the present invention.

Referring to FIG. 16, in block 1601, the MS determines whether to perform L2 scanning considering L1 scanning result. For example, the MS determines whether to perform L2 scanning using any one of schemes of FIGS. 4 to 6.

When the MS does not perform the L2 scanning, the MS terminates the procedure according to the embodiment of the present invention.

Alternatively, when the MS performs the L2 scanning, the MS proceeds to block 1603 and determines a duration for which a serving BS does not change the contents of an SFH, using an SFN of the serving BS. Here, a rule for the duration for which the serving BS does not change the contents of the SFH can be defined in a system standard, or can be defined by system configuration information.

The MS proceeds to block 1605 and determines an L2 scanning duration considering the duration for which the serving BS does not change the contents of the SFH. In detail, the MS determines the L2 scanning duration such that the MS selectively performs L2 scanning only for a superframe in which the neighbor BS transmits the SPx. For example, FIG. 18C assumes that a serving BS does not change the contents of an SFH in superframes that include SFNs satisfying '10' and '11' with respect to a modulo operation 12 (i.e., SFNs satisfying the Equation of (SFN) mod 12=10 and 11), and a neighbor BS transmits an S-SFH including an SPx in superframes that include SFNs satisfying '3' and '4' with respect to a modulo operation '4' (i.e., SFNs satisfying the Equation of (SFN) mod '4'='3' and '4'). In this example, the MS determines, as an L2 scanning duration, superframes in which a duration for which the serving BS does not change the contents of the SFH overlaps with a time point of transmission of the SFH at which the neighbor BS transmits the SPx.

After determining the L2 scanning duration, the MS proceeds to block 1607 and, if the L2 scanning duration arrives, converts its own operation frequency into an operation frequency of the neighbor BS which will perform the L2 scanning.

The MS proceeds to block 1609 and receives the SPx transmitted by the neighbor BS, thus acquiring L2 information of the neighbor BS.

After acquiring the L2 information of the neighbor BS, the MS proceeds to block 1611 and converts its own operation frequency into an operation frequency of the serving BS.

After the MS converts the operation frequency, the MS proceeds to block 1613 and performs communication with the serving BS using the contents of an SFH previously received from the serving BS. At this time, the MS performs communication with the serving BS using the contents of the latest SFH received from the serving BS.

Next, the MS proceeds to block 1615 and determines whether the L2 scanning duration expires.

If the L2 scanning duration does not expire, the MS returns to block 1607 and converts its own operation frequency into the operation frequency of the neighbor BS which will perform the L2 scanning. That is, the MS repeatedly performs blocks 1607 to 1613 during the L2 scanning duration.

Alternatively, if the L2 scanning duration expires, the MS terminates the procedure according to the embodiment of the present invention.

In FIG. 16, an MS determines an L2 scanning duration without considering a duration of no change of the contents of an SFH of a serving BS. Accordingly, if receiving a scanning response message from the serving BS, the MS judges that the serving BS does not change the contents of an SFH during the L2 scanning duration determined by the MS itself.

Figure 17:
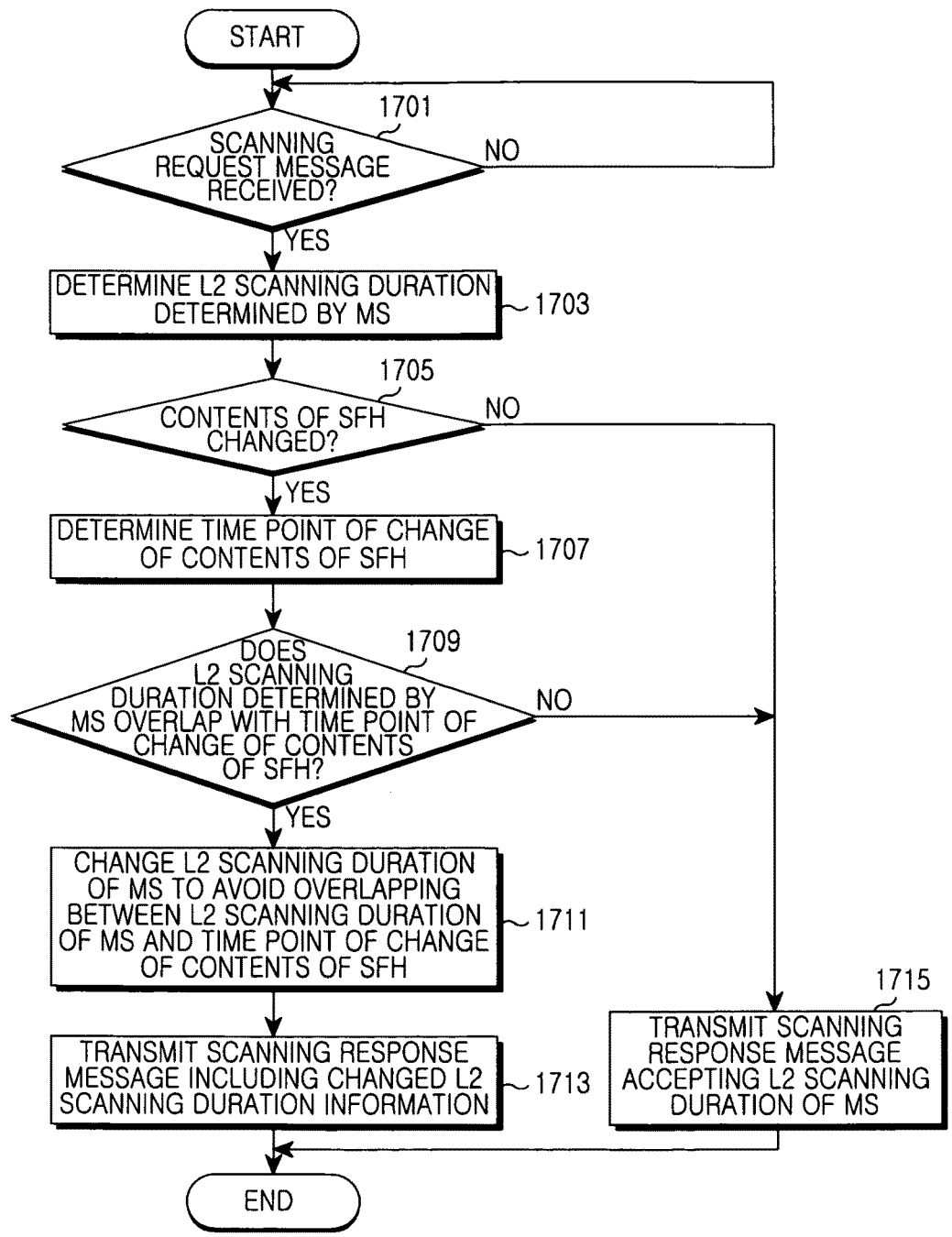
FIG. 17 illustrates a procedure for determining an L2 scanning duration of an MS in a BS according to an embodiment of the present invention.

Unlike a situation in which an MS determines an L2 scanning duration without considering a duration of no change of the contents of an SFH of a serving BS, the serving BS can determine the L2 scanning duration of the MS as illustrated in FIG. 17 below such that the MS can perform L2 scanning during the duration of no change of the contents of the SFH.

FIG. 17 illustrates a procedure for determining an L2 scanning duration of an MS in a BS according to an embodiment of the present invention.

Referring to FIG. 17, in block 1701, the BS determines whether a scanning request message is received from an MS provided with service.

If the scanning request message is received, the BS proceeds to block 1703 and determines an L2 scanning duration, which is determined by the MS, included in the scanning request message.

The BS proceeds to block 1705 and determines whether the BS plans to change the contents of an SFH.

If there is no plan to change the contents of the SFH, the BS accepts the L2 scanning duration determined by the MS. Accordingly, the BS proceeds to block 1715 and configures a scanning response message, which includes information on the acceptance of the L2 scanning duration determined by the MS, and transmits the scanning response message to the MS.

Alternatively, if there is a plan to change the contents of the SFH, the BS proceeds to block 1707 and determines a time point of change of the contents of the SFH.

The BS proceeds to block 1709 and determines whether the L2 scanning duration determined by the MS overlaps with the time point of change of the contents of the SFH.

If the L2 scanning duration determined by the MS does not overlap with the time point of change of the contents of the SFH, the BS accepts the L2 scanning duration determined by the MS. Accordingly, the BS proceeds to block 1715 and configures a scanning response message, which includes information on the acceptance of the L2 scanning duration determined by the MS, and transmits the scanning response message to the MS.

Alternatively, if the L2 scanning duration determined by the MS overlaps with the time point of change of the contents of the SFH, the BS proceeds to block 1711 and changes the L2 scanning duration of the MS such that the MS can perform L2 scanning during a duration of no change of the contents of the SFH. That is, the BS changes the L2 scanning duration of the MS such that the time point of change of the contents of the SFH does not overlap with the L2 scanning duration of the MS.

After changing the L2 scanning duration of the MS, the BS proceeds to block 1713 and configures a scanning response message, which includes information on the changed L2 scanning duration of the MS, and transmits the scanning response message to the MS.

Next, the BS terminates the procedure according to the embodiment of the present invention.

As described above, when a BS changes an L2 scanning duration determined by an MS in consideration of a duration of change of the contents of an SFH, the MS recognizes that the BS does not change the contents of the SFH during the L2 scanning duration included in a scanning response message. Accordingly, if the L2 scanning duration included in the scanning response message arrives, the MS performs L2 scanning.

In the aforementioned embodiment, a BS compares a duration of change of the contents of an SFH with an L2 scanning duration determined by an MS and determines the L2 scanning duration of the MS.

In another embodiment, a BS may compare a duration of no change of the contents of an SFH with an L2 scanning duration determined by an MS and determine the L2 scanning duration of the MS. In this example, if the duration of no change of the contents of the SFH overlaps with the L2 scanning duration determined by the MS, the BS accepts the L2 scanning duration determined by the MS. Alternatively, if the L2 scanning duration determined by the MS does not overlap with the duration of no change of the contents of the SFH, the BS changes the L2 scanning duration of the MS such that a time point of no change of the contents of the SFH overlaps with the L2 scanning duration of the MS.

Figure 19:
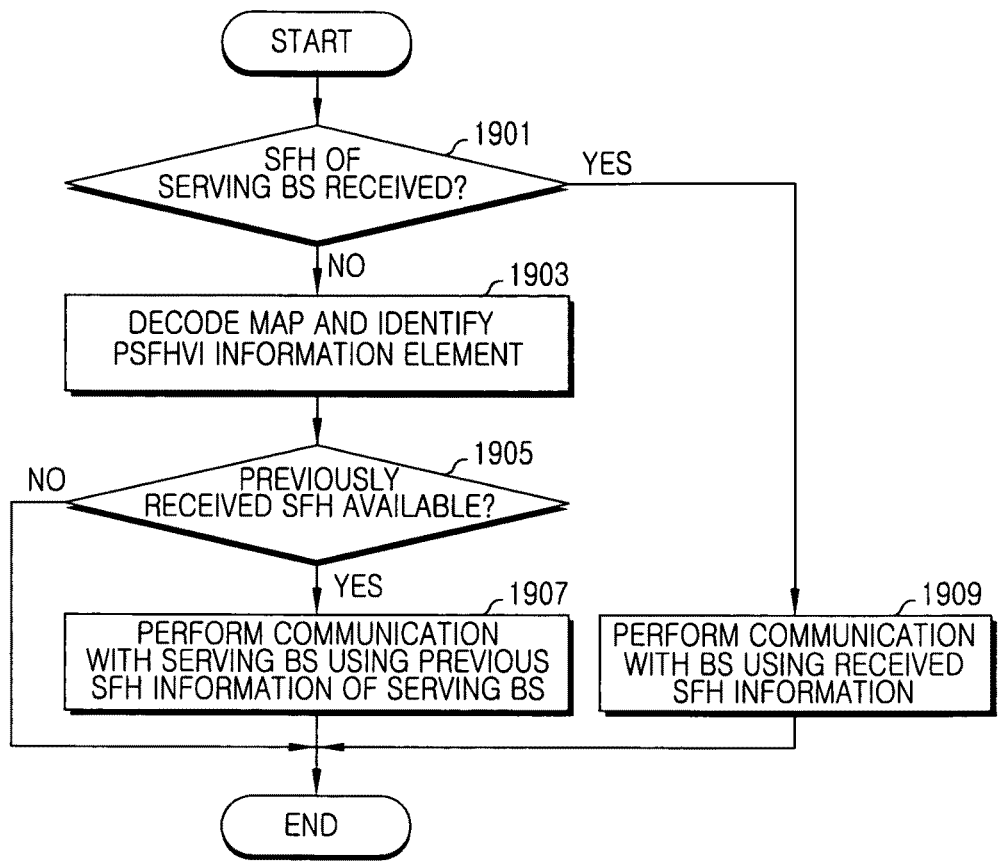
FIG. 19 illustrates a procedure for acquiring an SFH of a serving BS in an MS according to an embodiment of the present invention.

An MS judges the validity of an SFH previously received from a serving BS and acquires the contents of the SFH of the serving BS as illustrated in FIG. 19 below.

FIG. 19 illustrates a procedure for acquiring an SFH of a serving BS in an MS according to an embodiment of the present invention.

Referring to FIG. 19, in block 1901, the MS determines whether it receives an SFH of a serving BS for a resource for performing communication with the serving BS.

If the MS receives the SFH of the serving BS, the MS proceeds to block 1909 and performs communication with the serving BS using the contents of the received SFH.

Alternatively, if the MS fails to receive the SFH of the serving BS, the MS proceeds to block 1903 and determines a Previous SFH Validity Indicator (PSFHVI) included in a MAP of a superframe. Here, the PSFHVI is included in non-user-specific control information of the MAP, and is used as a basis for judging if information of the latest SFH received by the MS is available in an $n^{th}$ superframe.

The MS proceeds to block 1905 and determines whether it can perform communication with the serving BS using the contents of an SFH of the serving BS previously received considering the PSFHVI. For example, if the MS fails to receive or does not receive an SFH of the serving BS, the MS compares the number of times of continuously failing to receive or not receiving an SFH with the PSHFVI, and judges if the received latest SFH of the serving BS is available. At this time, if the number of times of continuously failing to receive or not receiving the SFH is less than or is equal to the PSFHVI, the MS judges information of the received latest SFH of the serving BS to be available.

If the MS judges the information of the latest received SFH of the serving BS to be available, the MS proceeds to block 1907 and performs communication with the serving BS using the contents of the latest received SFH of the serving BS.

Alternatively, if the MS judges the information of the latest received SFH to be non-available, the MS terminates the procedure according to the embodiment of the present invention.

The following description is made for a construction of an MS for performing L2 scanning.

Figure 20:
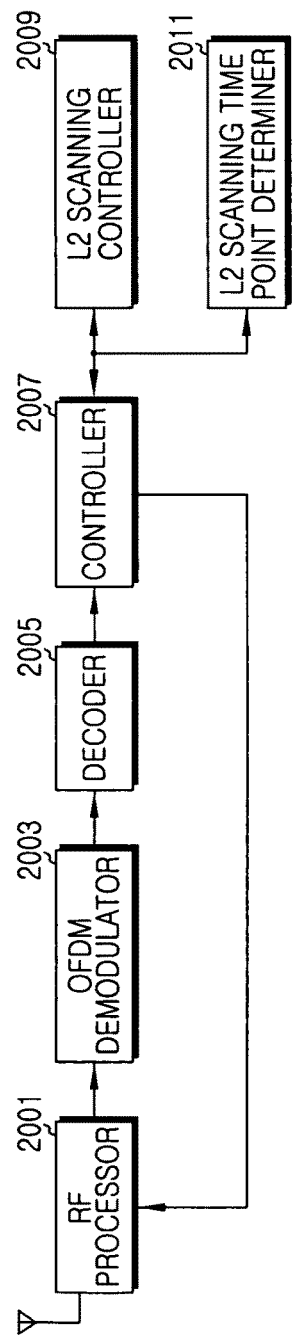
FIG. 20 illustrates a construction of an MS for L2 scanning according to an exemplary of the present invention.

FIG. 20 is a block diagram illustrating a construction of an MS for L2 scanning according to an embodiment of the present invention.

As illustrated in FIG. 20, the MS includes an RF processor 2001, an OFDM demodulator 2003, a decoder 2005, a controller 2007, an L2 scanning controller 2009, and an L2 scanning time point determiner 2011. Here, the RF processor 2001, the OFDM demodulator 2003, the decoder 2005, the controller 2007, and the L2 scanning controller 2009 perform the same operations as the RF processor 801, the OFDM demodulator 803, the decoder 805, the controller 807, and the L2 scanning controller 809 illustrated in FIG. 8. Accordingly, the following description omits the RF processor 2001, the OFDM demodulator 2003, the decoder 2005, the controller 2007, and the L2 scanning controller 2009.

The L2 scanning time point determiner 2011 determines an L2 scanning duration considering a time point of transmission of an SFH at which a neighbor BS transmits an SPx, in order to perform L2 scanning. For example, the L2 scanning time point determiner 2011 determines a time point of transmission of an SFH at which a neighbor BS transmits an SPx using an SFN of the neighbor BS. The L2 scanning time point determiner 2011 then determines an L2 scanning duration considering the time point of transmission of the SFH at which the neighbor BS transmits the SPx.

In another example, the L2 scanning time point determiner 2011 may determine a time point of transmission of an SFH at which a neighbor BS transmits an SPx considering both an SFN of the neighbor BS and a preamble index of the neighbor BS together. The L2 scanning time point determiner 2011 then determines an L2 scanning duration considering the time point of transmission of the SFH at which the neighbor BS transmits the SPx. Here, the L2 scanning time point determiner 2011 receives the preamble index of the neighbor BS, which is acquired through L1 scanning, from the controller 2007.

In another example, the L2 scanning time point determiner 2011 may determine an L2 scanning duration considering both a duration for which a serving BS cannot change the contents of an SFH and a time point of transmission of the SFH at which a neighbor BS transmits an SPx.

Accordingly, if the L2 scanning controller 2009 determines to perform L2 scanning, the controller 2007 controls the L2 scanning controller 2009 to perform the L2 scanning for SA preambles detected through L1 scanning, considering an L2 scanning time point determined in the L2 scanning time point determiner 2011.

In the aforementioned embodiment, the controller 2007 controls the L2 scanning controller 2009 to perform L2 scanning for SA preambles detected through L1 scanning, considering an L2 scanning time point determined in the L2 scanning time point determiner 2011.

In another embodiment, the controller 2007 controls the L2 scanning time point determiner 2011 to transmit information on an L2 scanning time point determined in the L2 scanning time point determiner 2011 to a serving BS in order to judge the validity or non-validity of the L2 scanning time point determined in the L2 scanning time point determiner 2011. The controller 2007 then controls the L2 scanning controller 2009 to perform L2 scanning for SA preambles detected through L1 scanning, considering the L2 scanning time point information included in a scanning response message received from the serving BS.

As described above, by allowing an MS to selectively perform L2 scanning considering L1 scanning result or to minimize an L2 scanning duration for acquiring neighbor BS information, the MS can maintain a real-time service quality even during scanning for femto BSs and prevent a deterioration of a system throughput in a wireless communication system where a macro cell and a femto cell coexist.

Also, by allowing an MS to perform L1 scanning in a unit of subframe, or by allowing a serving BS to change an SFH considering an L2 scanning time point of an MS, or by allowing an MS to determine an L2 scanning time point considering a time point of no change of an SFH of a serving BS, a resource loss resulting from scanning can be reduced, and a resource waste caused by a neighbor BS list can be eliminated because there is no need for a neighbor BS list for femto cells.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for determining neighbor Base Station (BS) information in a Mobile Station (MS) of a wireless communication system where a macro cell and a femto cell coexist, the method comprising:

when a preamble scanning duration begins, acquiring preamble information associated with at least one of a plurality of neighbor BSs through preamble scanning;

determining whether to scan a header for the at least one neighbor BS for which the preamble information has been acquired according to a variation of an environment of the preamble information acquired through the preamble scanning and other preamble information previously acquired through the preamble scanning, wherein determining whether to scan the header comprises:

determining whether a newly detected preamble information associated with another neighbor BS exists among the at least one preamble detected through the preamble scanning, determining a variation of a reception environment for the at least one preamble again detected through the preamble scanning, and in response to determining that at least one of the newly detected preamble and the at least one preamble whose reception environment variation is greater than a threshold variation, determining to scan the header of the neighbor BS that corresponds to the at least one of the newly detected preamble and the preamble whose reception environment variation is greater than the threshold variation; and in response to determining to scan the header, scanning the header for the at least one neighbor BS and acquiring a header information of the at least one neighbor BS.

2. The method of claim 1, further comprising:
determining a preamble scanning pattern through a negotiation with a serving BS before performing the preamble scanning; and
determining whether the preamble scanning duration begins according to the preamble scanning pattern.

3. The method of claim 1, wherein acquiring the preamble information comprises:
when the preamble scanning duration begins, converting an operation frequency band into another frequency band for the preamble scanning; and
detecting and measuring a Secondary Advanced (SA) preamble of the other frequency band and acquiring the preamble information on the at least one neighbor BS,
wherein the preamble information comprises at least one of a preamble index and a preamble measurement value.

4. The method of claim 1, wherein acquiring the preamble information comprises performing the preamble scanning in a unit of a subframe according to a preamble scanning pattern and acquiring the preamble information on the at least one neighbor BS,
wherein the preamble information comprises at least one of a preamble index and a preamble measurement value.

5. The method of claim 1, wherein the variation of the reception environment of the preamble is determined by considering both a number of preambles newly detected through the preamble scanning and a number of preambles deleted from a preamble monitoring set through the preamble scanning, and
wherein the preamble monitoring set represents a set of preambles detected through the preamble scanning.

6. The method of claim 1, wherein acquiring the header information comprises:
in response to determining to scan the header, determining a SuperFrame Number (SFN) of the neighbor BS for scanning the header through first header scanning;
determining a time point of transmission of a Sub Packet (SP) comprising the header information of the neighbor BS according to the SFN of the neighbor BS;
determining a second header scanning duration according to the time point of transmission of the SP; and
acquiring the header information of the neighbor BS through second header scanning during the second header scanning duration.

7. The method of claim 6, wherein determining the SFN comprises:

detecting a Primary-SuperFrame Header Information Element (P-SFH IE) including a SuperFrame Header (SFH) of the neighbor BS through the first header scanning; and
determining an SFN of the neighbor BS using the P-SFH IE.

8. The method of claim 6, wherein determining the time point of transmission of the SP comprises determining a time point of transmission of a Secondary SuperFrame Header Information Element (S-SFH IE), which includes an SFH of the neighbor BS comprising the SP according to the SFN of the neighbor BS, and
wherein the SP comprises the header information of the neighbor BS.

9. The method of claim 6, wherein determining the time point of transmission of the SP comprises considering both the SFN of the neighbor BS and an SA-preamble index of the neighbor BS acquired through the preamble scanning, the SP comprising the header information of the neighbor BS.

10. The method of claim 6, further comprising:
after determining the second header scanning duration, transmitting a scanning request message comprising the second header scanning duration information to a serving BS; and
when a scanning response message accepting scanning is received from the serving BS, acquiring the header information of the neighbor BS through the second header scanning during the second header scanning duration.

11. The method of claim 10, further comprising, after acquiring the header information of the neighbor BS, performing communication with the serving BS using information of an SFH previously received SFH from the serving BS.

12. The method of claim 6, wherein determining the second header scanning duration further comprises determining the second header scanning duration according to both the time point of transmission of the SP and a duration for which a serving BS cannot change the contents of an SFH.

13. The method of claim 12, further comprising, after acquiring the header information of the neighbor BS, performing communication with the serving BS using information of the SFH previously received from the serving BS.

14. The method of claim 1, wherein acquiring the header information comprises decoding an S-SFH IE of an SFH of the neighbor BS during the header scanning duration and acquiring the header information on the neighbor BS,
wherein the decoded S-SFH IE comprises an SP comprising the header information, and
wherein the header information comprises at least one of a BS Identifier (ID) and a Closed Subscriber Group (CSG) ID.

15. An apparatus configured to determine neighbor Base Station (BS) information in a Mobile Station (MS) of a wireless communication system where a macro cell and a femto cell coexist, the apparatus comprising:
a receiver configured to receive a signal of an operation frequency band;
a controller configured to:
control a conversion of the operation frequency band of the receiver for preamble scanning and header scanning;
when a preamble scanning duration begins, acquire preamble information of at least one of a plurality of neighbor BSs via the preamble scanning; and
in response to determining to scan the header by a scanning controller, acquire the header information on at least one neighbor BS via the header scanning, wherein the scanning controller is configured to determine whether to scan the header for the at least one neighbor BS among the neighbor BSs for which the preamble information has been acquired according to a variation of an environment of a preamble acquired through the preamble scanning and other preamble information previously acquired through the preamble scanning, wherein, when at least one of a newly detected preamble and a preamble whose reception environment variation is greater than a threshold variation exists, the scanning controller is further configured to determine whether to scan the header of a neighbor BS that corresponds to at least one of the newly detected preamble and the preamble whose reception environment variation is greater than the threshold variation.

16. The apparatus of claim 15, wherein the controller is further configured to determine a preamble scanning pattern and a header scanning pattern through a negotiation with a serving BS.

17. The apparatus of claim 15, wherein, when the preamble scanning duration begins, the controller is configured to detect and measure a Secondary Advanced (SA) preamble of a corresponding frequency band and acquire the preamble information on the at least one neighbor BS, and
wherein the preamble information comprises at least one of a preamble index and a preamble measurement value.

18. The apparatus of claim 15, wherein the controller is further configured to perform the preamble scanning in a unit of a subframe according to a preamble scanning pattern and acquire the preamble information on the at least one neighbor BS, and
wherein the preamble information comprises at least one of a preamble index and a preamble measurement value.

19. The apparatus of claim 15, wherein the scanning controller is further configured to determine a variation of a reception environment of a preamble according to both a number of preambles newly detected through the preamble scanning and a number of preambles deleted from a preamble monitoring set through the preamble scanning, and
wherein the preamble monitoring set represents a set of preambles detected through the preamble scanning.

20. The apparatus of claim 15, further comprising a scanning duration determiner configured to determine a time point of transmission of a Sub Packet (SP), which comprises the header information of the neighbor BS, considering a SuperFrame Number (SFN) of the neighbor BS for scanning the header through first header scanning, and determine a second header scanning duration considering the time point of transmission of the SP, and
wherein, in response to determining to scan the header in the scanning controller, the controller is further configured to acquire the header information of the neighbor BS through second header scanning during the second header scanning duration determined by the scanning duration determiner.

21. The apparatus of claim 20, wherein the scanning duration determiner is further configured to detect a Primary-SuperFrame Header Information Element (P-SFH IE) constituting a SuperFrame Header (SFH) of the neighbor BS through the first header scanning, and determine the SFN of the neighbor BS using the P-SFH IE.

22. The apparatus of claim 20, wherein the scanning duration determiner is further configured to determine a time point of transmission of a Secondary SuperFrame Header Information Element (S-SFH IE), which constitutes an SFH of the neighbor BS comprising the SP, considering the SFN of the neighbor BS, and
wherein the SP comprises the header information of the neighbor BS.

23. The apparatus of claim 20, wherein the scanning duration determiner is further configured to determine the time point of transmission of the SP, which comprises the header information of the neighbor BS according to both the SFN of the neighbor BS and an SA-preamble index of the neighbor BS acquired through the preamble scanning.

24. The apparatus of claim 20, wherein the controller is further configured to:
transmit a scanning request message which comprises the second header scanning duration information determined in the scanning duration determiner, to a serving BS; and
when a scanning response message accepting scanning is received from the serving BS, acquire the header information of the neighbor BS through the second header scanning during the second header scanning duration.

25. The apparatus of claim 24, wherein, after acquiring the header information of the neighbor BS, the controller is further configured to perform communication with the serving BS using information of an SFH previously received from the serving BS.

26. The apparatus of claim 20, wherein the scanning duration determiner is further configured to determine the second header scanning duration considering both the time point of transmission of the SP and a duration for which a serving BS cannot change the contents of an SFH.

27. The apparatus of claim 15, wherein the controller is further configured to decode an S-SFH IE of an SFH of the neighbor BS during the header scanning duration and acquires the header information on the neighbor BS,
wherein the decoded S-SFH IE comprises the SP comprising the header information, and
wherein the header information comprises at least one of a BS Identifier (ID) and a Closed Subscriber Group (CSG) ID.

* * * * *